United States Patent
Yasuda et al.

(10) Patent No.: US 8,845,314 B2
(45) Date of Patent: Sep. 30, 2014

(54) LENS MANUFACTURING APPARATUS

(75) Inventors: Shin Yasuda, Kanagawa (JP); Keishi Shimizu, Kanagawa (JP); Yoshio Nishihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 204 days.

(21) Appl. No.: 13/461,381

(22) Filed: May 1, 2012

(65) Prior Publication Data

US 2013/0149404 A1 Jun. 13, 2013

(30) Foreign Application Priority Data

Dec. 13, 2011 (JP) ................................. 2011-271950

(51) Int. Cl.
*B29D 11/00* (2006.01)
*B29C 47/92* (2006.01)

(52) U.S. Cl.
USPC ........ 425/115; 425/145; 425/150; 425/174.4; 425/254; 425/302.1; 425/317; 425/385; 425/447; 425/470

(58) Field of Classification Search
CPC ..................... B29C 47/92; B29C 2497/92219; B29C 2497/92247; B29C 2497/92542; B29D 11/00298; B29D 11/00365
USPC ......... 425/115, 140, 142, 144, 145, 147, 149, 425/150, 174.4, 193, 195, 235, 57, 4, 575, 425/258, 292, 295, 302.1, 305.1, 309, 313, 425/317, 385, 396, 44, 7, 470, 471, 808; 264/405, 1.32, 1.34, 410, 412, 264/492–496, 219, 220, 225, 226, 284, 293

See application file for complete search history.

(56) References Cited

U.S. PATENT DOCUMENTS

| | | | | |
|---|---|---|---|---|
| 5,281,371 A | * | 1/1994 | Tamura et al. | 264/1.33 |
| 5,820,794 A | * | 10/1998 | Jung | 264/1.33 |
| 6,151,085 A | * | 11/2000 | Tomono et al. | 349/1 |
| 6,600,162 B1 | * | 7/2003 | Hahmann et al. | 250/492.1 |
| 7,749,410 B2 | * | 7/2010 | Shimizu et al. | 264/1.24 |
| 7,815,425 B2 | * | 10/2010 | Tokita et al. | 425/174.4 |
| 2002/0006558 A1 | | 1/2002 | Kobayashi et al. | |
| 2002/0122839 A1 | * | 9/2002 | Chapman et al. | 425/174.4 |
| 2003/0022470 A1 | * | 1/2003 | Liu et al. | 438/496 |
| 2004/0211329 A1 | * | 10/2004 | Funahata et al. | 101/463.1 |

(Continued)

FOREIGN PATENT DOCUMENTS

| | | |
|---|---|---|
| JP | A-07-261119 | 10/1995 |
| JP | A-2000-002802 | 1/2000 |

(Continued)

*Primary Examiner* — Dimple Bodawala
(74) *Attorney, Agent, or Firm* — Oliff PLC

(57) ABSTRACT

A lens manufacturing apparatus includes a concave-convex shape forming unit that makes a notch in the surface of a workpiece to form a concave-convex shape portion, a resin supply unit that supplies resin for a lens onto the surface of the workpiece, a resin curing unit that cures the supplied resin for a lens, a moving unit that moves the concave-convex shape forming unit, the resin supply unit, and the resin curing unit relative to the workpiece, and a control unit that controls driving of the concave-convex shape forming unit, the resin supply unit, the resin curing unit, and the moving unit so as to form the concave-convex shape portion extending in a predetermined direction, supply the resin for a lens between adjacent concave-convex shape portions and cure the supplied resin for a lens.

17 Claims, 31 Drawing Sheets

(56) References Cited

U.S. PATENT DOCUMENTS

| | | | |
|---|---|---|---|
| 2006/0230964 A1* | 10/2006 | Watanabe et al. | 101/454 |
| 2007/0090567 A1* | 4/2007 | Hwang | 264/293 |
| 2008/0023858 A1 | 1/2008 | Kobayashi et al. | |
| 2008/0026304 A1 | 1/2008 | Kobayashi et al. | |
| 2008/0043337 A1 | 2/2008 | Kobayashi et al. | |
| 2008/0070156 A1 | 3/2008 | Kobayashi et al. | |
| 2008/0081283 A1 | 4/2008 | Kobayashi et al. | |
| 2008/0085478 A1 | 4/2008 | Kobayashi et al. | |
| 2008/0093764 A1* | 4/2008 | Ito et al. | 264/101 |
| 2008/0254394 A1 | 10/2008 | Kobayashi et al. | |
| 2008/0254626 A1* | 10/2008 | Kasumi et al. | 438/689 |
| 2009/0233243 A1 | 9/2009 | Kobayashi et al. | |
| 2009/0261516 A1* | 10/2009 | Lake | 264/571 |
| 2010/0112311 A1 | 5/2010 | Kobayashi et al. | |
| 2010/0140849 A1* | 6/2010 | Comb et al. | 264/401 |
| 2010/0148397 A1* | 6/2010 | Nakamura et al. | 264/293 |
| 2010/0181691 A1* | 7/2010 | Yoshida | 264/1.36 |
| 2010/0247757 A1 | 9/2010 | Inoue | |
| 2010/0289161 A1* | 11/2010 | Yamada et al. | 264/1.1 |
| 2011/0091570 A1* | 4/2011 | DeCusatis et al. | 359/619 |
| 2011/0151124 A1* | 6/2011 | Ina | 427/277 |
| 2011/0230623 A1* | 9/2011 | Hirano et al. | 525/309 |
| 2012/0038084 A1* | 2/2012 | Lee et al. | 264/293 |
| 2012/0126460 A1* | 5/2012 | Shin et al. | 264/495 |
| 2013/0099405 A1* | 4/2013 | Kraemer | 264/40.1 |
| 2013/0220217 A1* | 8/2013 | Shimizu et al. | 118/37 |
| 2013/0295214 A1* | 11/2013 | Yoshida | 425/150 |

FOREIGN PATENT DOCUMENTS

| | | | | |
|---|---|---|---|---|
| JP | A-2000-180996 | | 6/2000 | |
| JP | 2001179928 A | * | 7/2001 | B41C 1/18 |
| JP | 2002086461 A | * | 3/2002 | B29C 39/18 |
| JP | 2007176039 A | * | 7/2007 | B29C 43/32 |
| JP | A-2010-211082 | | 9/2010 | |
| JP | A-2010-224200 | | 10/2010 | |
| JP | 2011148181 A | * | 8/2011 | B29C 59/02 |
| JP | 2011207192 A | * | 10/2011 | B29C 43/32 |

* cited by examiner

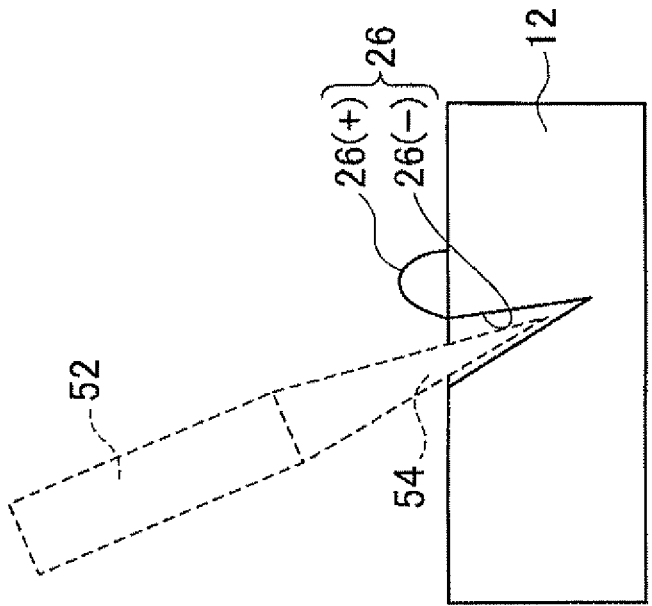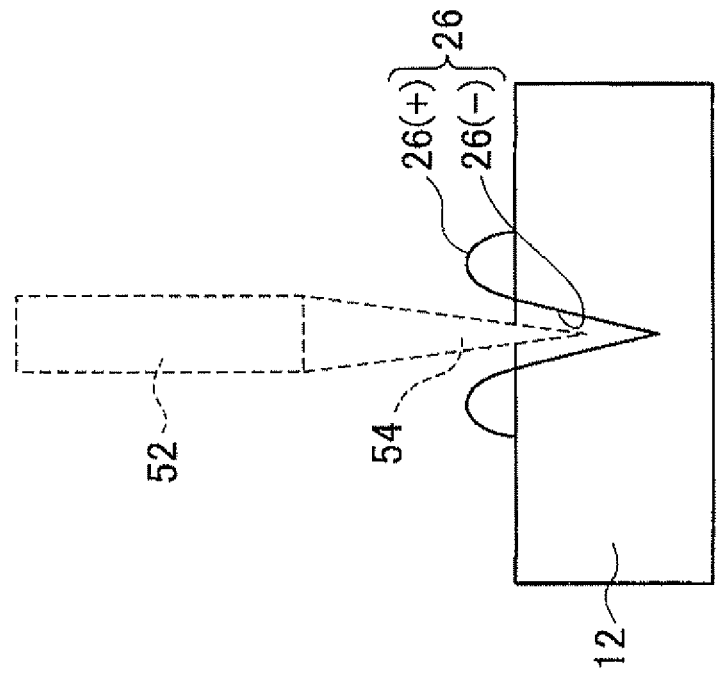

TRANSPORTING DIRECTION

ARRAY DIRECTION

LENS MANUFACTURING APPARATUS

CROSS-REFERENCE TO RELATED APPLICATIONS

This application is based on and claims priority under 35 USC 119 from Japanese Patent Application No. 2011-271950 filed Dec. 13, 2011.

BACKGROUND

TECHNICAL FIELD

The present invention relates to a lens manufacturing apparatus.

SUMMARY

According to an aspect of the invention, there is provided a lens manufacturing apparatus including: a concave-convex shape forming unit that makes a notch in the surface of a workpiece to form a concave-convex shape portion; a resin supply unit that supplies resin for a lens onto the surface of the workpiece; a resin curing unit that cures the supplied resin for a lens; a moving unit that moves the concave-convex shape forming unit, the resin supply unit, and the resin curing unit relative to the workpiece; and a control unit that controls driving of the concave-convex shape forming unit, the resin supply unit, the resin curing unit, and the moving unit so as to form the concave-convex shape portion extending in a predetermined direction, supply the resin for a lens between adjacent concave-convex shape portions and cure the supplied resin for a lens.

BRIEF DESCRIPTION OF THE DRAWINGS

Exemplary embodiments of the present invention will be described in detail based on the following figures, wherein:

FIGS. 4A and 4B are cross-sectional views showing an example of an concave-convex shape portion formed in a workpiece;

FIG. 16A is a plan view, FIG. 16B is a side view, and FIG. 16C is a front view;

FIG. 19A is a plan view, and FIG. 19B is a side view;

DETAILED DESCRIPTION

Exemplary embodiments of the invention will be described below with reference to the accompanying drawings.

First Exemplary Embodiment

Lens Manufacturing Apparatus

Figure 1:
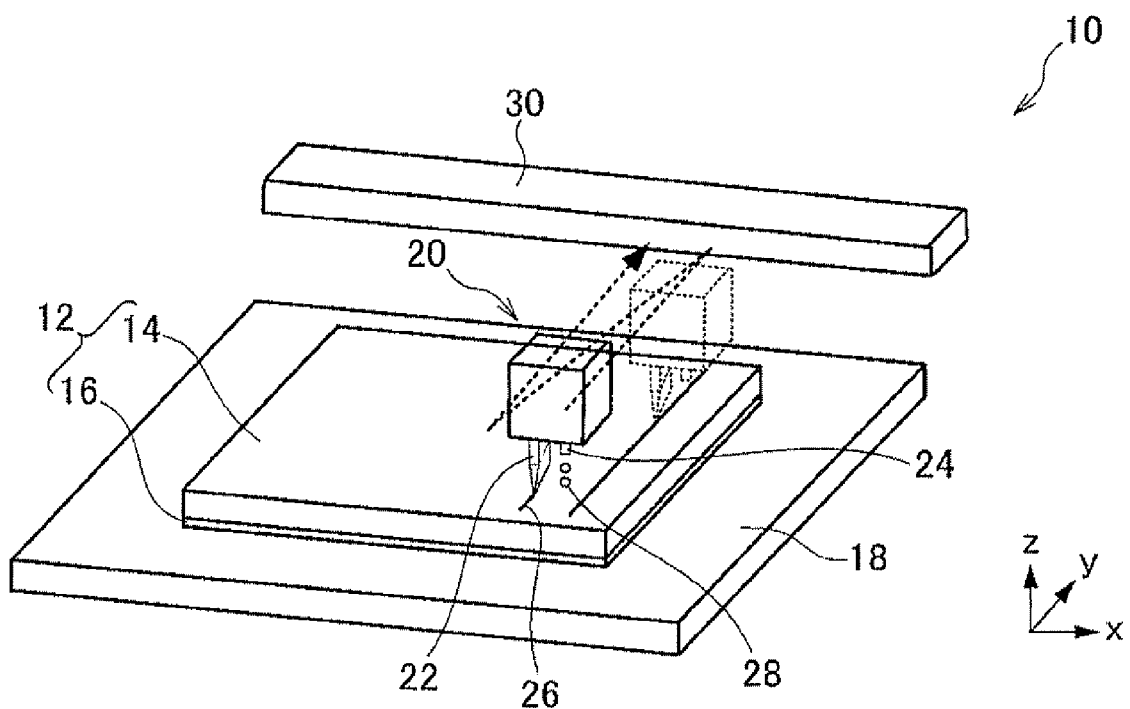
FIG. 1 is a schematic perspective view showing the configuration of a lens manufacturing apparatus related to a first exemplary embodiment.
Figure 2:
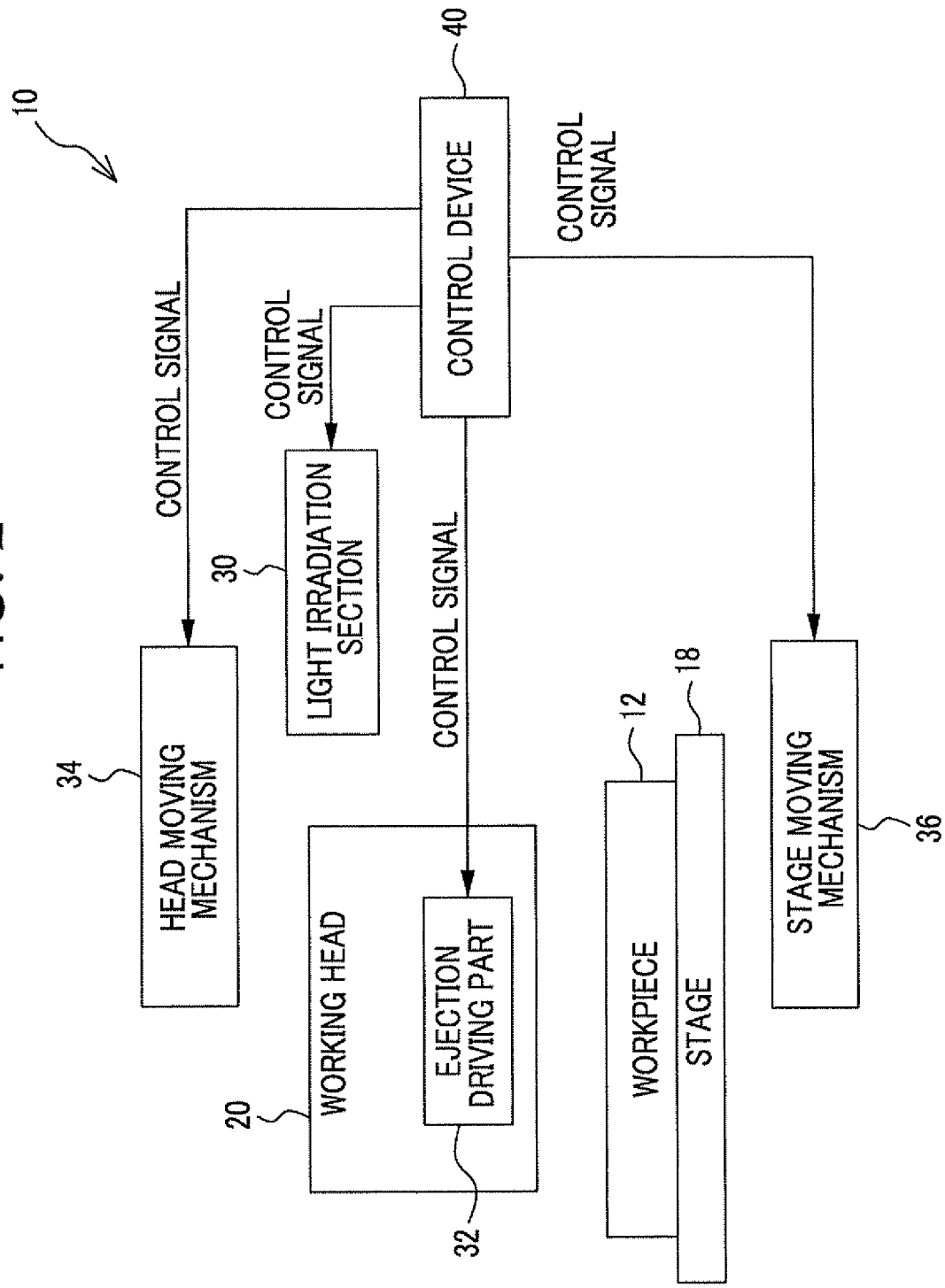
FIG. 2 is a block diagram showing an electrical configuration of the lens manufacturing apparatus related to the first exemplary embodiment.

A lens manufacturing apparatus related to a first exemplary embodiment of the invention will be described. FIG. 1 is a schematic perspective view showing the configuration of the lens manufacturing apparatus related to the first exemplary embodiment. FIG. 2 is a block diagram showing an electrical configuration of the lens manufacturing apparatus related to the first exemplary embodiment.

As shown in FIG. 1, the lens manufacturing apparatus 10 includes a stage 18 that holds a workpiece 12, a working head 20 that machines the workpiece 12, and a light irradiation section 30 that irradiates the workpiece 12 with curing light. In the present exemplary embodiment, the working head 20 is moved as shown by a dotted-line arrow with respect to the workpiece 12 held on the stage 18. The workpiece 12 has a plate-shaped resin base 14 made of a resin material, and a sheet member 16. The resin base 14 is arranged on the sheet member 16 so as to face the working head 20.

In the present exemplary embodiment, the working head 20 is moved in three directions, an x direction, a y direction, and a z direction that are orthogonal to each other. In addition, the working head 20 may be moved relative to the workpiece 12, or the stage 18 may be moved instead of the working head 20. Additionally, in the present exemplary embodiment, the example in which the workpiece 12 in which the resin base 14 is arranged on the sheet member 16 is used has been described. However, a workpiece 12 on the surface of which a notch is to be formed may be used, and the form of the workpiece 12 is not particularly limited.

The working head 20 includes an concave-convex shape forming section 22 that forms an concave-convex shape portion in the workpiece 12, and a resin supply section 24 that supplies resin 28 to the workpiece 12. The concave-convex shape forming section 22 makes a notch 26 that extends in a predetermined direction (y direction) in the surface (that is, the surface of the resin base 14) of the workpiece 12, and forms an concave-convex shape portion. The resin supply section 24 supplies liquid photocurable resin 28 to be used for formation of lenses between adjacent concave-convex shape portions on the workpiece 12. The light irradiation section 30 irradiates the liquid resin 28 supplied onto the workpiece 12 with curing light, such as ultraviolet light. The resin 28 is cured by light irradiation to form lenses 60 to be described below (refer to FIGS. 6A and 6B).

In the present exemplary embodiment, the example in which the liquid resin 28 is ejected from an ejection port similarly to an ink jet system to supply the resin 28 to the workpiece 12 is described. However, the method of supplying the resin 28 is not limited to "ejection". For example, the resin 28 may be supplied by "injection" or the like. In a case where the resin 28 is supplied by ejection, liquid resin 28 having flowability suitable for the ejection is used.

As shown in FIG. 2, the working head 20 includes an ejection driving part 32 that ejects the liquid resin 28 from the resin supply section 24, for example, by applying a voltage as in the ink jet system or the like, and supplies the resin 28 to the workpiece 12. Additionally, the lens manufacturing apparatus 10 includes a head moving mechanism 34 that moves the working head 20, and a stage moving mechanism 36 that moves the stage 18. The light irradiation section 30, the ejection driving part 32, the head moving mechanism 34, and the stage moving mechanism 36 are electrically connected to a control device 40, respectively.

The control device 40 is constituted as a computer that performs the control and various operations of the overall apparatus. That is, the control device 40 includes a CPU (Central Processing Unit), a ROM (Read Only Memory) that stores various programs, a RAM (Random Access Memory) to be used as a work area when a program is executed, a nonvolatile memory that stores various kinds of information, and an input/output interface (I/O). The CPU, the ROM, the RAM, the nonvolatile memory, and the I/O interface are connected together via buses, respectively. The light irradiation section 30, the ejection driving part 32, the head moving mechanism 34, and the stage moving mechanism 36 drive an object on the basis of control signals from the control device 40, respectively.

In addition, as the sheet member 16, for example, a sheet member in which a parallax image for stereoscopic vision according to a lens array system is formed may be used. A stereoscopic display sheet that has a lens array, such as lenticular lenses, is completed by forming the resin base 14 and plural lenses 60 on the sheet member 16 in which a parallax image is formed. Here, the principle of the stereoscopic vision according to the lens array system will be simply described. A parallax image for stereoscopic vision includes image pieces of plural two-dimensional images prepared for every viewpoint. A lens array is arranged between the parallax image and a viewpoint. The lens array is constituted so as to reach the image pieces of the two-dimensional images corresponding to a line of sight from the viewpoint. By seeing the parallax image through the lens array, a three dimensional image (stereoscopic model) is displayed on the basis of the parallax produced between viewpoints.

Working Head

Figure 3:
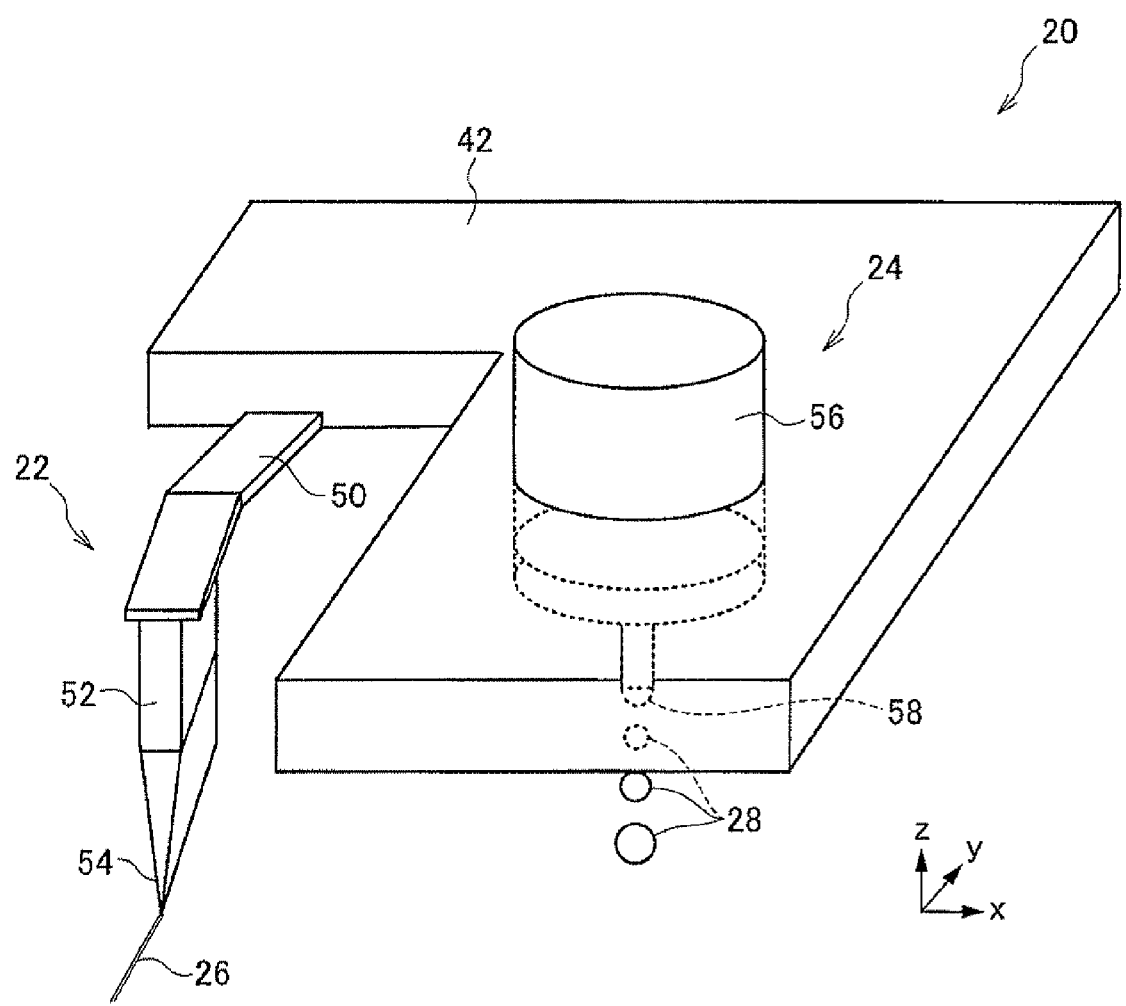
FIG. 3 is a perspective view showing an example of the configuration of a working head.

The configuration of the working head will be specifically described. FIG. 3 is a perspective view showing an example of the configuration of the working head. As shown in FIG. 3, in the present exemplary embodiment, the working head 20 is integrated such that the concave-convex shape forming section 22 and the resin supply section 24 are held by the holding member 42. The head moving mechanism 34 moves the holding member 42 to move the working head 20. The resin supply section 24 move along with the concave-convex shape forming section 22, and alignment thereof during resin supply becomes easy.

The concave-convex shape forming section 22 includes one cutting blade 52. The cutting blade 52 is supported by a supporting portion 50 so that the length direction (the direction of the blade) of the blade tip 54 faces the y direction. The form of the blade tip 54 may be a single grind edge or a double grind edge. In a case where the plural lenses 60 are formed, a double grind edged cutting blade 52 in which the blade tip 54 has a symmetrical shape may be used. If the double grind edged cutting blade 52 is used, as will be described below, convex portions are formed at opening edges on both sides of the concave portion (refer to FIG. 4A). In addition, "the blade tip 54 has a symmetrical shape", for example as shown in FIG. 3, means a case where the shape of the blade tip 54 is symmetrical with respect to a plane (yz plane) along the center of the blade tip 54 in the width direction (x direction).

Further, the cutting blade may be replaced by a laser unit that irradiates the surface of the workpiece with a laser beam.

The supporting portion 50 is constituted by a rod-shaped or belt-shaped member having elasticity, such as a plate spring. One end of the supporting portion 50 is connected to the holding member 42. The cutting blade 52 is supported at the other end of the supporting portion 50. As the cutting blade 52 is supported by the supporting portion 50 having elasticity, the blade tip 54 comes into contact with the surface of the workpiece 12. As the working head 20 moves in the y direction with respect to the workpiece 12, the surface of the workpiece 12 is pulled or pressed and cut and the notch 26 that extends in the y direction is formed.

The resin supply section 24 includes a resin holding container 56 holding the resin 28 therein. The resin holding container 56 includes an ejection port 58 that ejects the resin 28. The ejection port 58 communicates with the resin holding container 56, and the resin 28 held in the resin holding container 56 is ejected to the outside through the ejection port 58. The resin holding container 56 may be constituted by, for example, a cylindrical container. Additionally, the ejection port 58 may be constituted by a cylindrical member having a smaller diameter than the resin holding container 56.

The resin holding container 56 is held by the holding member 42 so that the ejection port 58 faces the surface of the workpiece 12, for example, such that the resin holding container 56 is fitted into a through hole formed in the holding member 42. The resin supply section 24 is driven by the ejection driving part 32 shown in FIG. 2, ejects the liquid resin 28 from the ejection port 58, and supplies the resin 28 onto the surface of the workpiece 12.

Formation of Convex Portion

The structure of an concave-convex shape portion to be formed in a workpiece will be described. FIGS. 4A and 4B are cross-sectional views showing an example of an concave-convex shape portion formed in a workpiece. A cross-section in a case where the workpiece 12 is cut along the x direction is shown. As shown in FIG. 4A, if the surface of the workpiece 12 is pulled or pressed and cut by the blade tip 54 of the cutting blade 52, a linear notch 26 is formed. The notch 26 has a concave portion 26 (−) that is deeply cut from the surface and a convex portion 26 (+) that protrudes from the surface.

The convex portion 26 (+) is formed along the opening edge of the concave portion 26 (−). In this example, the convex portions 26 (+) that extend in the y direction are formed at the opening edges on both sides of the concave portion 26 (−) with respect to the concave portion 26 (−) that extends in the y direction. As will be described below, the liquid resin 28 used for formation of lenses is supplied between two convex portions 26 (+) that are adjacent in the x direction. As plural notches 26 are formed, the flow of the resin 28 in the x direction is suppressed by the two adjacent convex portions 26 (+), and a semi-columnar lens 60 that extends (that is, has anisotropy) in the y direction is formed.

In the present exemplary embodiment, the notch 26 having the convex portion 26 that determines a formation region of the lens 60 is formed as a notch made by the blade tip 54 of the cutting blade 52. In the method of forming the notch 26 having the convex portion 26, the convex portion 26 (+) is formed by a simple method compared to a related-art technique that reforms the surface of a lens formation region or a related-art technique that forms a partition wall by an ink jet system. Additionally, the convex portion 26 (+) that is uniform over the length direction (y direction) compared to the above related-art technique is formed by being pulled or pressed and cut by the blade tip 54 of the cutting blade 52.

The height of the convex portion 26 (+) is set according to the radius of curvature of a lens 60 to be formed and the width (the length of the x direction) of the lens 60. If the width of the lens 60 is made constant, the height of the convex portion 26 (+) may be made small in order to make the radius of curvature of the lens 60 small. As the height of the convex portion 26 (+) is smaller, the volume between two adjacent convex portions 26 (+) becomes small. Accordingly, a lens 60 with a desired radius of curvature is formed even if the supply amount of the liquid resin 28 is little. If the supply amount of the liquid resin 28 is increased even if the height (that is, the volume between adjacent convex portions) of the convex portion 26 (+) is made constant, the radius of curvature of the lens 60 becomes small.

In addition, if the surface of the workpiece 12 is pulled or pressed and cut in a state where the cutting blade 52 inclines (a state where the cutting blade inclines to the left in the drawing) as shown in FIG. 4B, a convex portion 26 (+) that extends in the y direction is formed at the opening edge on one side (the right in the drawing) of a concave portion 26 (−) with respect to a concave portion 26 (−) that extends in the y direction. Even in a case where the convex portion 26 (+) is formed at the opening edge on one side, the flow of the resin 28 in the x direction is suppressed by two adjacent convex portions 26 (+) as plural notches 26 are formed.

Lens Machining

Next, lens machining using the above lens manufacturing apparatus will be described. FIGS. 5A to 5D are cross-sectional views showing respective processes carried out in the lens machining. FIGS. 6A and 6B are perspective views showing an example of a lens array formed by the lens machining.

(1) First Convex Portion Forming Process

Figure 5A:
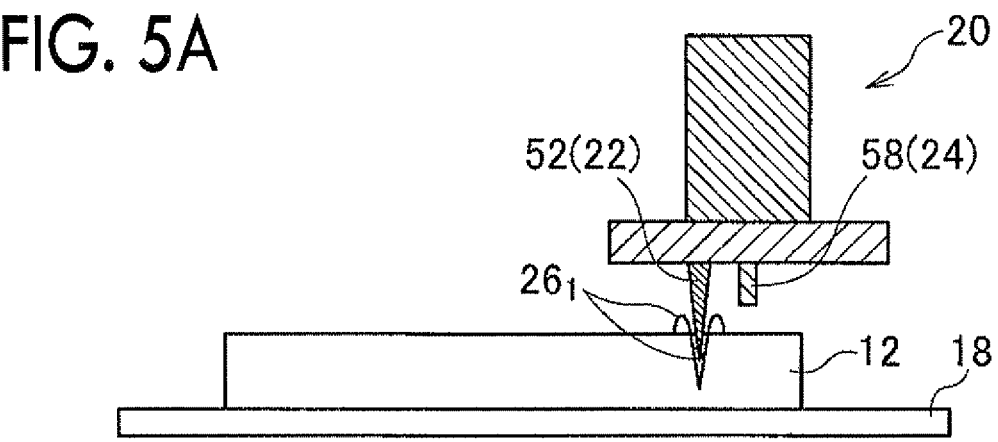
FIGS. 5A to 5D are cross-sectional views showing respective processes carried out in lens machining.
Figure 6A:
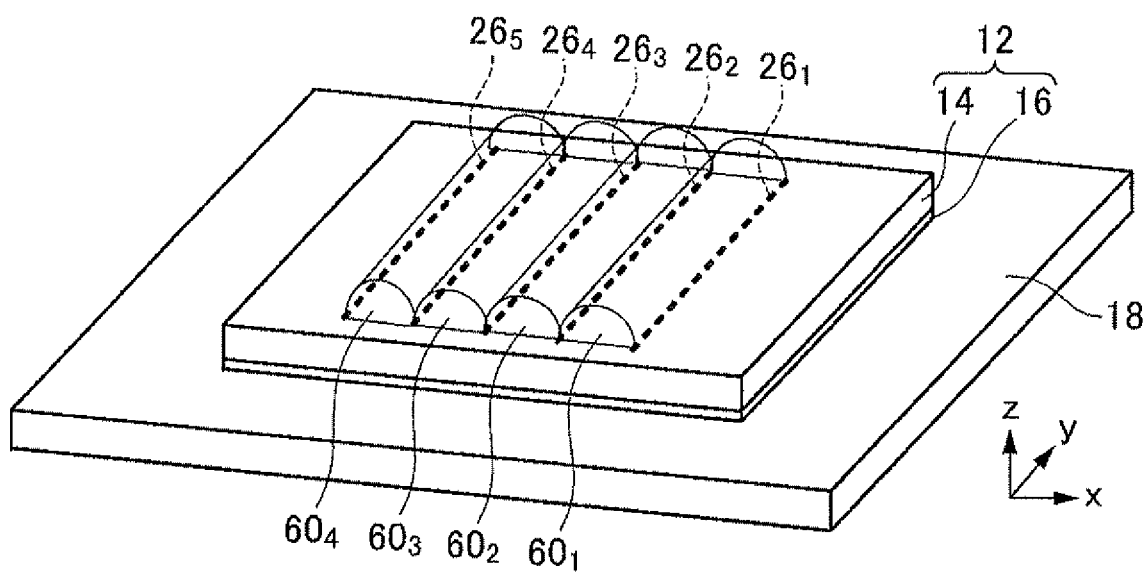
FIGS. 6A and 6B are perspective views showing an example of a lens array formed by the lens machining.
Figure 6B:
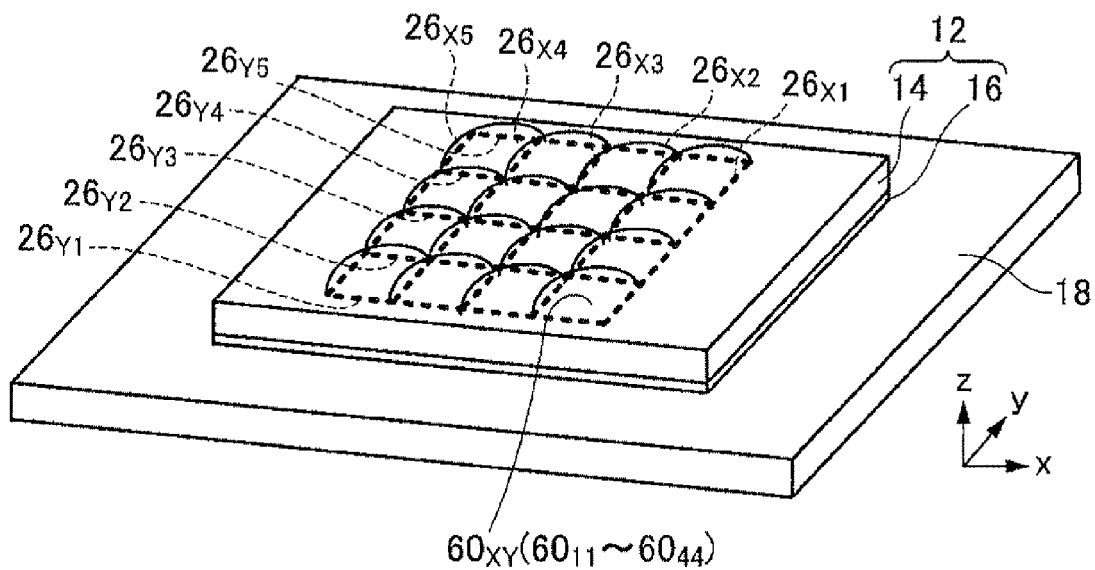

As shown in FIG. 5A, the working head 20 is moved along the z direction with respect to the workpiece 12 held on the stage 18 so that the blade tip 54 of the cutting blade 52 comes into contact with the surface of the workpiece 12. For example, the traveling distance in the z direction is set so that the notch 26 has a predetermined depth. Additionally, the traveling distance in the z direction is set so that the pressure applied to the blade tip 54 of the cutting blade 52 becomes a predetermined pressure.

The working head 20 is moved along the y direction in a state where the blade tip 54 comes into contact with the surface of the workpiece 12. The surface of the workpiece 12 is pulled and cut by the cutting blade 52, and the first notch $26_1$ is linearly formed. After the first notch $26_1$ is formed, the working head 20 is moved along the z direction so that the blade tip 54 is separated from the surface of the workpiece 12.

The cutting blade may be replaced by a laser unit that irradiates the surface of the workpiece with a light beam. When the working head is moved along the y direction in a state where the laser unit irradiates the surface of the workpiece with enough energy to melt the resin base, the resin base irradiated with the beam will melt to form a linear convex portion (+) along the concave portion (−).

(2) Convex Portion and Lens Forming Process

Figure 5B:
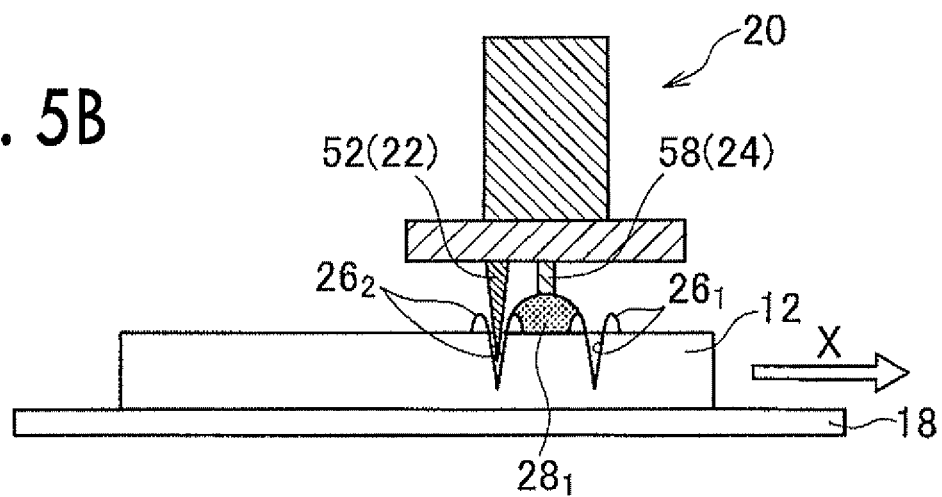

As shown in FIG. 5B, the working head 20 is moved along the x direction with respect to the workpiece 12 held on the stage 18 so that a second notch $26_2$ is formed. Next, the working head 20 is moved along the z direction so that the blade tip 54 of the cutting blade 52 comes into contact with the surface of the workpiece 12. The working head 20 is moved along the y direction in a state where the blade tip 54 comes into contact with the surface of the workpiece 12. The surface of the workpiece 12 is pulled and cut by the cutting blade 52, and the second notch $26_2$ is linearly formed.

Additionally, the liquid resin 28 is ejected from the ejection port 58 of the resin supply section 24 in conjunction with the movement of the working head 20 in the y direction. The second notch $26_2$ is formed by the cutting blade 52, and resin $28_1$ is supplied between the notch $26_1$ and the notch $26_2$ that are adjacent to each other. Each of the adjacent notches $26_1$ and $26_2$ has a linear convex portion. The flow of the resin 28 in the x direction is suppressed by the two mutually parallel convex portions. The supplied resin $28_1$ rises in the shape of a semi-columnar lens 60 that extends in the y direction (that is, has anisotropy). After the second notch $26_2$ is formed, the working head 20 is moved along the z direction so that the blade tip 54 is separated from the surface of the workpiece 12.

Here, the interval in the x direction between two adjacent notches 26 may be the same interval as a predetermined lens interval. For example, when the sheet member 16 in which a parallax image for stereoscopic vision is formed is used, the lens interval is set according to stereoscopic display design, such as a parallax image or observation distance. The height of the convex portion 26 (+) is set according to the radius of curvature of the lens 60 to be formed and the width of the lens 60, as above. Additionally, if the width of the lens 60 is made constant as above, the volume between adjacent convex portions is determined according to the height of the convex portion 26 (+), and the supply amount of the liquid resin 28 is set according to the volume between the adjacent convex portions.

As shown in FIG. 6A, in the present exemplary embodiment, a lens array that has plural (four in the drawing) semi-columnar lenses 60 is formed on the surface of the workpiece 12 having the resin base 14. In the illustrated example, a lens array having four semi-columnar lenses $60_1$ to $60_4$ is formed. Plural lenses (convex portions) 60 made of resin are formed on the resin base 14. Thereby, lenticular lenses are formed on the sheet member 16 in which a parallax image is formed.

In the lens machining, the convex portion and lens forming process shown in FIG. 5B are repeated according to the number of lenses 60 to be formed. In this example, as shown in FIG. 5O, the four lenses $60_1$ to $60_4$ are formed on the surface of the workpiece 12. In order to form the four lenses $60_1$ to $60_4$, five notches $26_1$ to $26_5$ and four resins $28_1$ to $28_4$ are formed. In addition, the number of lenses and the number of resins are not limited to the illustrated numbers. In a case where the plural lenses $60_1$ to $60_4$ do not need to be distinguished, the lenses are generically referred to as the lenses 60. In a case where the plural notches $26_1$ to $26_5$ do not need to be distinguished, the notches are generically referred to as the notches 26. In a case where the plural resins $28_1$ to $28_4$ do not need to be distinguished, the resins are generically referred to as the resins 28.

Figure 5C:
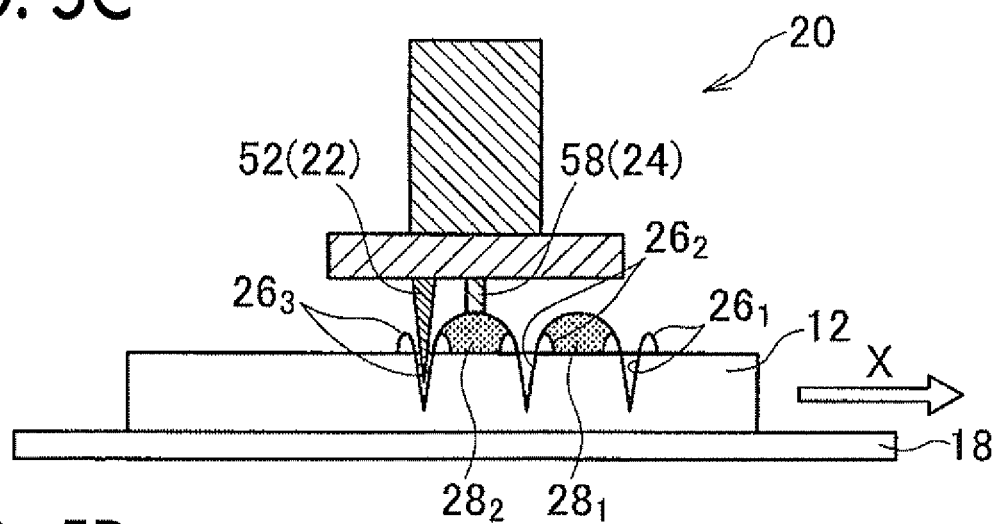

For example, as shown in FIG. 5C, after the second notch $26_2$ is formed, the working head 20 is moved along the x direction so that a third notch $26_3$ is formed in the workpiece 12. Next, the working head 20 is moved along the z direction so that the blade tip 54 of the cutting blade 52 comes into contact with the surface of the workpiece 12. The working head 20 is moved along the y direction in a state where the blade tip 54 comes into contact with the surface of the workpiece. The surface of the workpiece 12 is pulled and cut by the cutting blade 52, and the third notch $26_3$ is linearly formed. Resin $28_2$ is supplied between the notch $26_2$ and the notch $26_3$ that are adjacent to each other in conjunction with the movement of the working head 20 in the y direction. The supplied resin $28_2$ rises in the shape of a semi-columnar lens 60.

(3) Curing Process

Figure 5D:
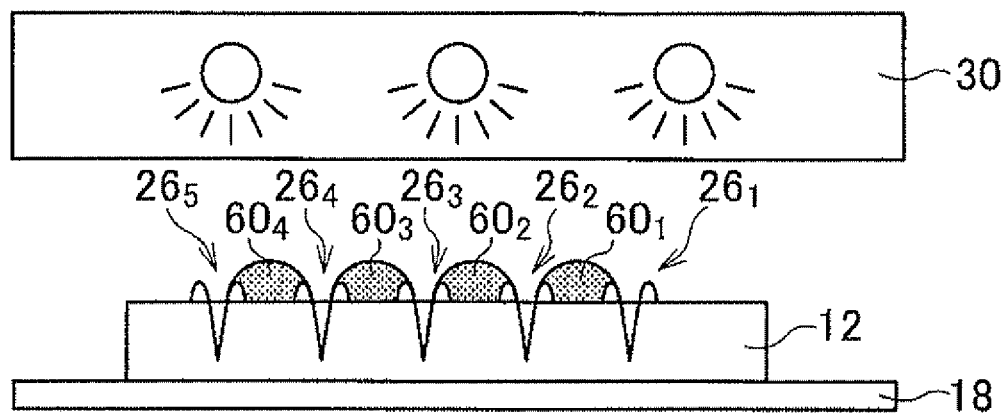

As shown in FIG. 5D, after a desired number of the resins 28 are formed, the stage 18 is moved along the y direction so that the workpiece 12 held on the stage 18 is irradiated with curing light from the light irradiation section 30. The workpiece 12 held on the stage 18 is moved to a position that faces the light irradiation section 30, and the four resins $28_1$ to $28_4$ on the surface of the workpiece 12 are irradiated with curing light. The four resins $28_1$ to $28_4$ are cured, and the four lenses $60_1$ to $60_4$ are formed.

In addition, although the example in which a lens array having the plural semi-columnar lenses 60 is formed has been described in the above lens machining, the lens array is not necessarily limited to this form. For example, as shown in FIG. 6B, a lens array having plural microlenses 60 may be formed on the surface of the workpiece 12 having the resin base 14. In the example of the illustrated lens array, sixteen rectangular lenses $60_{11}$ to $60_{44}$ are arrayed in a matrix of 4×4 having four columns in the x direction and four rows in the y direction.

In order to form the lens array in which the plural lenses 60 are arrayed in a matrix, notches 26X that are lined up in the x direction and notches 26Y that are lined up in the y direction intersecting (includes orthogonally intersecting) the x direction are formed. In order to form the lens array having the sixteen lenses $60_{11}$ to $60_{44}$, five notches $26X_1$ to $26X_5$ that are lined up in the x direction and five notches $26Y_1$ to $26Y_5$ that are lined up in the y direction are formed. The resins 28 are supplied to respective masses formed by the five notches $26X_1$ to $26X_5$ and the five notches $26Y_1$ to $26Y_5$, and lenses $60_{XY}$ corresponding to the respective masses are formed. In addition, the number of lenses and the number of resins are not limited to the illustrated numbers. Furthermore, the lens shape is not restricted to a rectangle, but can be designed arbitrarily. By producing a polygonal shape such as a hexagon by intersecting the plural notches, the lens in the shape of a hexagon can be produced. Similarly, by producing a circular shape with the notch, the lens in a circular shape can be produced.

Figure 7:
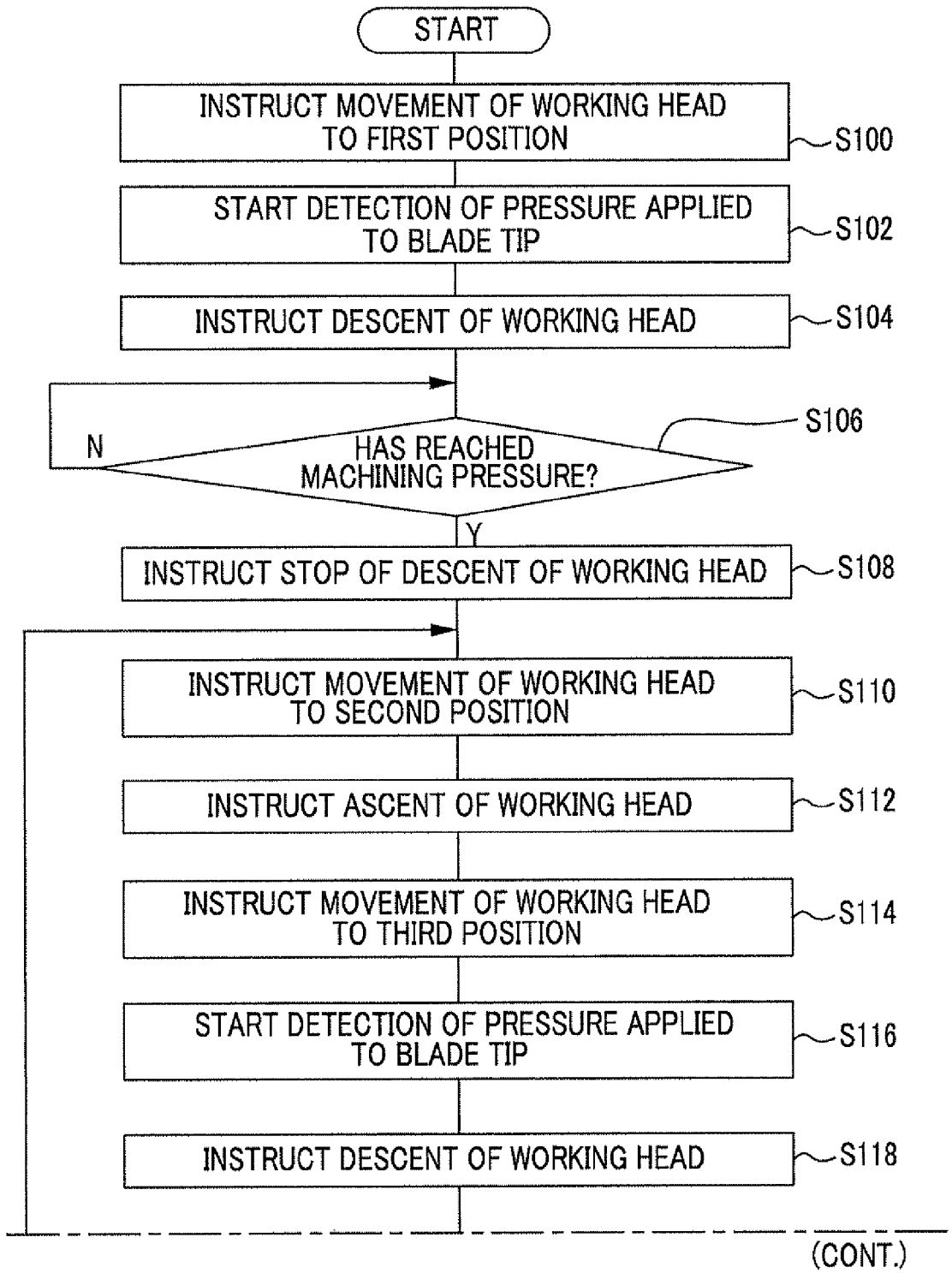
FIG. 7 is a flowchart showing a procedure of the lens machining.
Figure 7:
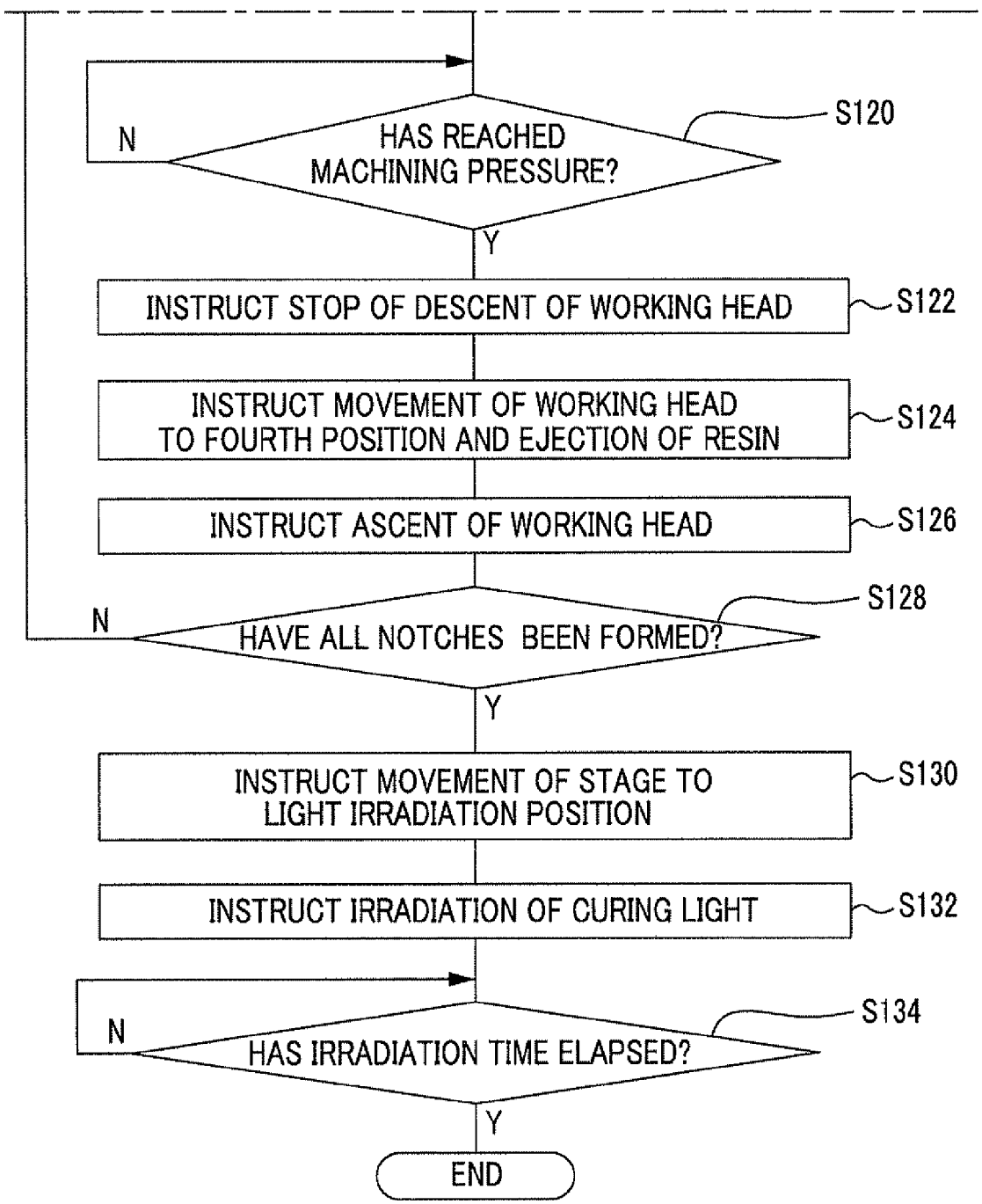

A procedure of the lens machining is stored in a storage unit of the control device 40 as a control program of the lens manufacturing apparatus 10. The control program is read from the storage unit and executed by a CPU of the control device 40. FIG. 7 is a flowchart showing the procedure of the lens machining.

The lens machining is started if the start of the processing is instructed by an operator, in a state where the workpiece 12 is held on the stage 18. Here, an example in which n notches 62 that are lined up in the x direction are formed, and (n−1) lenses 60 are formed will be described. In addition, k is an integer that is equal to or more than 3 and equal to less than n.

In Step 100, the head moving mechanism 34 is instructed so that the working head 20 moves to a first position that becomes a starting point of the first notch $26_1$. The head moving mechanism 34 moves the working head 20 in the x direction and the y direction to move the working head to the first position.

In Step 102, detection of the pressure applied to the blade tip 54 of the cutting blade 52 is started by a pressure detector (not shown), such as a pressure sensor provided within the apparatus. The pressure detector (not shown) is connected to the control device 40, and a detection signal of the pressure detector is input to the control device 40 such that the detection signal is converted into a digital signal.

In Step 104, the head moving mechanism 34 is instructed so that the working head 20 descends along the z direction at the first position. The head moving mechanism 34 moves the working head 20 in the z direction to bring the blade tip 54 of the cutting blade 52 into contact with the surface of the workpiece 12.

In Step 106, whether or not the pressure applied to the blade tip 54 of the cutting blade 52 has reached a predetermined machining pressure is repeatedly determined. The machining pressure is set according to the kind or physical properties of the workpiece 12, the shape of the blade tip 54 of the cutting blade 52, the shape (for example, the presence and height of the convex portion 26 (+)) of the notch 26, or the like. If the pressure doesn't have reached a predetermined machining pressure, the determination is repeated, and if the pressure has reached a predetermined machining pressure, the processing proceeds to Step 108.

In addition, the setting value of the machining pressure is stored in advance in the storage unit of the control device 40, and is read and used from the storage unit. For example, the lower limit of the machining pressure at which the convex portion 26 (+) is formed is obtained in advance according to the hardness of the workpiece 12. The machining pressure may be set according to the hardness of the workpiece 12 on the basis of the relationship between the hardness and the machining pressure (lower limit). In this case, the relationship between the hardness and the machining pressure (lower limit) is stored in advance in the form of tables or the like in the storage unit of the control device 40. As the hardness is lower, the surface of the workpiece 12 is in a softer state, and the machining pressure is smaller.

Otherwise, the machining pressure at which a required height of the convex portion 26 (+) is formed may be obtained in advance according to the radius of curvature of the lens 60. If the width of the lens 60 is made constant, the height of the convex portion 26 (+) is set according to the radius of curvature of the lens 60. Additionally, the machining pressure is obtained according to the set height of the convex portion 26 (+). Accordingly, the machining pressure may be set according to the radius of curvature of the lens 60 on the basis of the relationship between the radius of curvature and the machining pressure. In this case, the relationship between the radius of curvature and the machining pressure is stored in advance in the form of tables or the like in the storage unit of the control device 40.

In Step 108, the head moving mechanism 34 is instructed so that the descent of the working head 20 is stopped. The head moving mechanism 34 stops the movement of the working head 20, and brings the blade tip 54 of the cutting blade 52 into contact with the surface of the workpiece 12 at a predetermined machining pressure.

In Step 110, the head moving mechanism 34 is instructed so that the working head 20 moves to a second position that becomes an end point of the first notch $26_1$. The head moving mechanism 34 moves the working head 20 along the y direction to move the working head to the second position. The surface of the workpiece 12 is pulled and cut by the cutting blade 52 in a state where the blade tip 54 is brought into contact with the surface of the workpiece 12 at a predetermined machining pressure, and the first notch $26_1$ is linearly formed.

In Step 112, the head moving mechanism 34 is instructed so that the working head 20 goes up along the z direction at the second position. The head moving mechanism 34 moves the working head 20 in the z direction to separate the blade tip 54 of the cutting blade 52 from the surface of the workpiece 12.

In Step 114, the head moving mechanism 34 is instructed so that the working head 20 moves to a third position that becomes a starting point of the second notch $26_2$. The head moving mechanism 34 moves the working head 20 in the x direction and the y direction to move the working head to the third position. In addition, in the case of a k-th notch $26_k$, the third position is read as a "(2k−1)-th position".

In Step 116, detection of the pressure applied to the blade tip 54 of the cutting blade 52 is started by a pressure detector (not shown) provided within the concave-convex shape forming section 22.

In Step 118, the head moving mechanism 34 is instructed so that the working head 20 descends along the z direction at the third position. The head moving mechanism 34 moves the working head 20 in the z direction to bring the blade tip 54 of the cutting blade 52 into contact with the surface of the workpiece 12.

In Step 120, it is repeatedly determined whether or not the pressure applied to the blade tip 54 of the cutting blade 52 has reached a predetermined machining pressure. If the pressure doesn't have reached a predetermined machining pressure, the determination is repeated, and if the pressure has reached a predetermined machining pressure, the processing proceeds to Step 122.

In Step 122, the head moving mechanism 34 is instructed so that the descent of the working head 20 is stopped. The head moving mechanism 34 stops the movement of the working head 20, and brings the blade tip 54 of the cutting blade 52 into contact with the surface of the workpiece 12 at a predetermined machining pressure.

In Step 124, the head moving mechanism 34 is instructed so that the working head 20 moves to a fourth position that becomes an endpoint of the second notch $26_2$. Simultaneously, the ejection driving part 32 of the working head 20 is instructed so that the resin 28 is ejected in conjunction with the movement of the working head 20 in the y direction. In addition, in the case of the k-th notch $26_k$, the fourth position is read as a "(2k)-th position".

The head moving mechanism 34 moves the working head 20 along the y direction to move the working head to the fourth position. The surface of the workpiece 12 is pulled and cut by the cutting blade 52 in a state where the blade tip 54 is brought into contact with the surface of the workpiece 12 at a predetermined machining pressure, and the second notch $26_2$ is linearly formed.

Additionally, the ejection driving part 32 ejects the resin 28 from the ejection port 58 of the resin supply section 24 simultaneously with the movement of the working head 20, and supplies the resin $28_1$ between the notch $26_1$ and the notch $26_2$ that are adjacent to each other. The supplied resin $28_1$ rises in the shape of a semi-columnar lens $60_1$ that extends in the y direction.

The supply amount (the ejection amount) of resin 28 per unit time is obtained in advance from the radius of curvature of the lens 60, the volume between two adjacent convex portions 26 (+), or the like as above. In addition, the setting value of the supply amount of the resin 28 is stored in advance in the storage unit of the control device 40, and is read and used from the storage unit.

For example, in a case where the width of the lens 60 and the height of the convex portion 26 (+) are made constant, and the radius of curvature of the lens 60 is made small, the supply amount of the resin 28 according to the radius of curvature of the lens 60 to be formed may be set on the basis of the relationship between the radius of curvature of the lens 60, and the supply amount of the resin 28, such as increasing the supply amount of the resin 28. In this case, the relationship between the radius of curvature of the lens 60 and the supply amount of the resin 28 is stored in advance in the form of tables or the like in the storage unit of the control device 40.

In Step 126, the head moving mechanism 34 is instructed so that the working head 20 ascends along the z direction at the fourth position. The head moving mechanism 34 moves the working head 20 in the z direction to separate the blade tip 54 of the cutting blade 52 from the surface of the workpiece 12.

In Step 128, it is determined whether or not all the number of (n) notches 26 are formed. If all the number of (n) notches 26 are formed, the processing proceeds to Step 130. If all the number of (n) notches 26 aren't formed, the processing returns to Step 114, and the processes from Step 114 to Step 128 are repeatedly performed until all the number of notches 26 are formed.

In Step 130, the stage moving mechanism 36 is instructed so that the stage 18 on which the workpiece 12 is held moves to a light irradiation position that faces the light irradiation section 30. The stage moving mechanism 36 moves the stage 18 on which the workpiece 12 is held to the light irradiation position of the light irradiation section 30.

In Step 132, the light irradiation section 30 is instructed so that the workpiece 12 held on the stage 18 is irradiated with curing light from the light irradiation section 30. In detail, the irradiation driving part that turns on and drives a light source of the light irradiation section 30 is instructed. The light irradiation section 30 irradiates plural resins 28 on the surface of the workpiece 12 with curing light, and cures the plural resins 28, respectively, to form plural lenses 60.

In Step 134, it is determined whether or not a predetermined irradiation time has lapsed. If the irradiation time doesn't have lapsed, the determination is repeated, and if the irradiation time has lapsed, the routine is ended.

Modification of Working Head

Figure 8A:
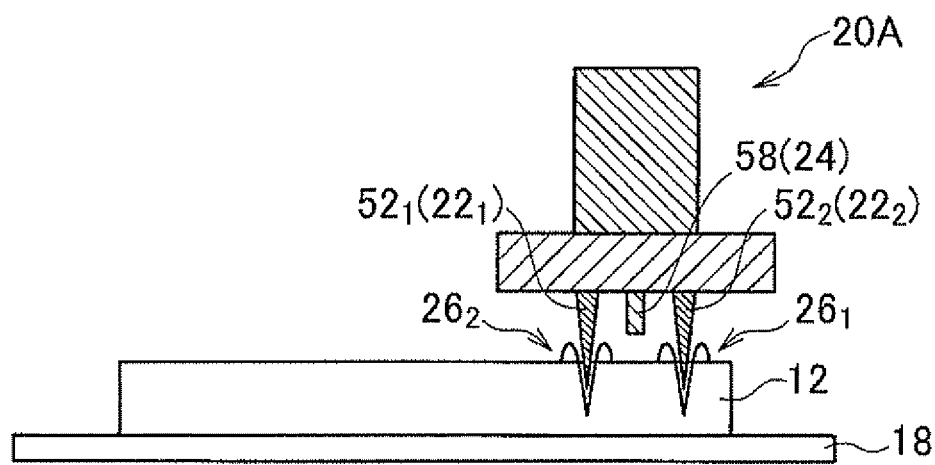
FIGS. 8A to 8C are cross-sectional views showing a modification of the working head.
Figure 8B:
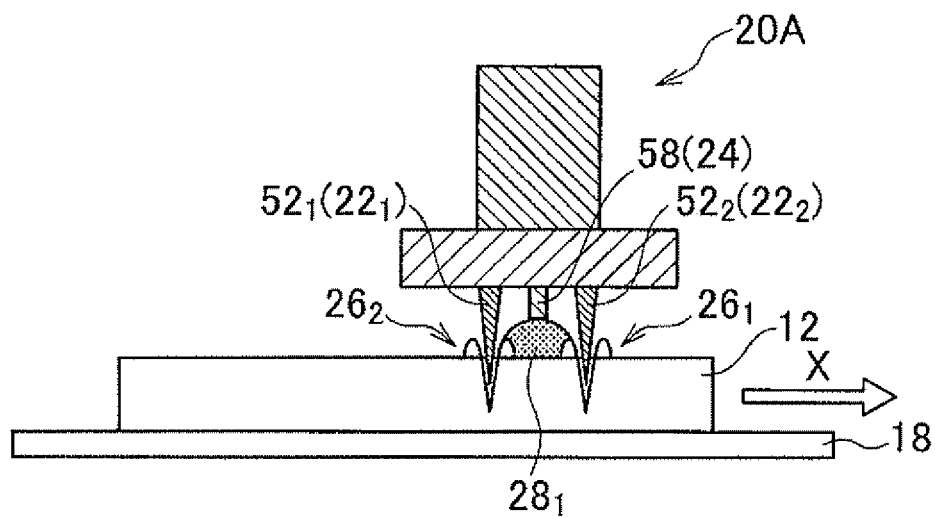
Figure 8C:
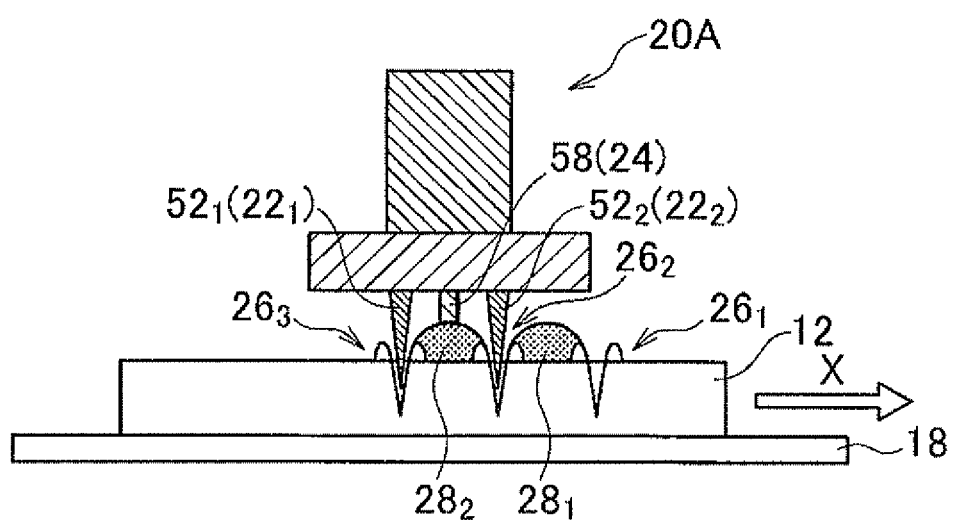

Although the working head 20 including one cutting blade 52 as an concave-convex shape forming section 22 has been described above, the working head 20 may include plural cutting blades 52. FIGS. 8A to 8C are cross-sectional views showing a modification of the working head. The working head 20A of the modification includes two cutting blades, a cutting blade $52_1$ and a cutting blade $52_2$.

The cutting blade $52_1$ and the cutting blade $52_2$ are arranged so as to be spaced apart by a predetermined interval in the x direction. In addition, similarly to the cutting blade 52 shown in FIG. 3, each of the cutting blade $52_1$ and the cutting blade $52_2$ is supported by the supporting portion 50 having one end connected to a common holding member 42 so that the blade tips 54 come into contact with on the surface of the workpiece 12.

(1) First Convex Portion Forming Process

As shown in FIG. 8A, a working head 20A is moved along the y direction with respect to the workpiece 12 held on the stage 18 in a state where the blade tips 54 come into contact with the surface of the workpiece 12. The surface of the workpiece 12 is pulled and cut by the cutting blade $52_1$ and the cutting blade $52_2$, respectively, whereby the first notch $26_1$ is linearly formed and the second notch $26_2$ is linearly formed. After the notch $26_1$ and the notch $26_2$ are formed, the working head 20A is moved along the z direction so that the blade tip 54 is separated from the surface of the workpiece 12.

(2) Convex Portion and Lens Forming Process

As shown in FIG. 8B, the working head 20A is moved along the y direction with respect to the workpiece 12 held on the stage 18, and the liquid resin 28 is ejected from the ejection port 58 of the resin supply section 24. The cutting blade $52_1$ and the cutting blade $52_2$ move along the corresponding notch $26_1$ and notch $26_2$, respectively. Additionally, the resin $28_1$ is supplied between the notch $26_1$ and the notch $26_2$ that are adjacent to each other in conjunction with the movement of the working head 20 in the y direction. The supplied resin $28_1$ rises in the shape of a semi-columnar lens 60. After the resin $28_1$ is supplied, the working head 20A is moved along the z direction so that the blade tip 54 is separated from the surface of the workpiece 12.

Subsequently, as shown in FIG. 8C, the working head 20A is moved along the x direction with respect to the workpiece 12 held on the stage 18 so that the third notch $26_3$ is formed. Next, the working head 20A is moved along the z direction so that the blade tips 54 of the cutting blade $52_1$ and the cutting blade $52_2$ are brought into contact with the surface of the workpiece 12. The working head 20A is moved along the y direction in a state where the respective blade tips 54 of the cutting blade $52_1$ and the cutting blade $52_2$ come into contact with the surface of the workpiece 12.

The cutting blade $52_2$ moves along the notch $26_2$ with the corresponding notch $26_2$ as a guide groove. The surface of the workpiece 12 is pulled and cut by the cutting blade $52_1$ with the movement of the working head 20A in the y direction, and the third notch $26_3$ is linearly formed. The resin $28_2$ is supplied between the notch $26_2$ and the notch $26_3$ that are adjacent to each other. The supplied resin $28_2$ rises in the shape of a semi-columnar lens 60. By moving one cutting blade $52_2$ with the already formed notch $26_2$ as a guide groove and forming a new notch $26_3$ using the other cutting blade $52_1$, alignment becomes easy, and positional offset of the new notch $26_3$ is suppressed.

In the lens machining, the convex portion and lens forming process shown in FIGS. 8B and 8C are repeated according to the number of lenses 60 to be formed. Thereafter, the workplace 12 held on the stage 18 is moved to a position that faces the light irradiation section 30, and the resins 28 on the surface of the workpiece 12 are irradiated with curing light. The resins 28 are cured, respectively, to form lenses 60.

Figure 9:
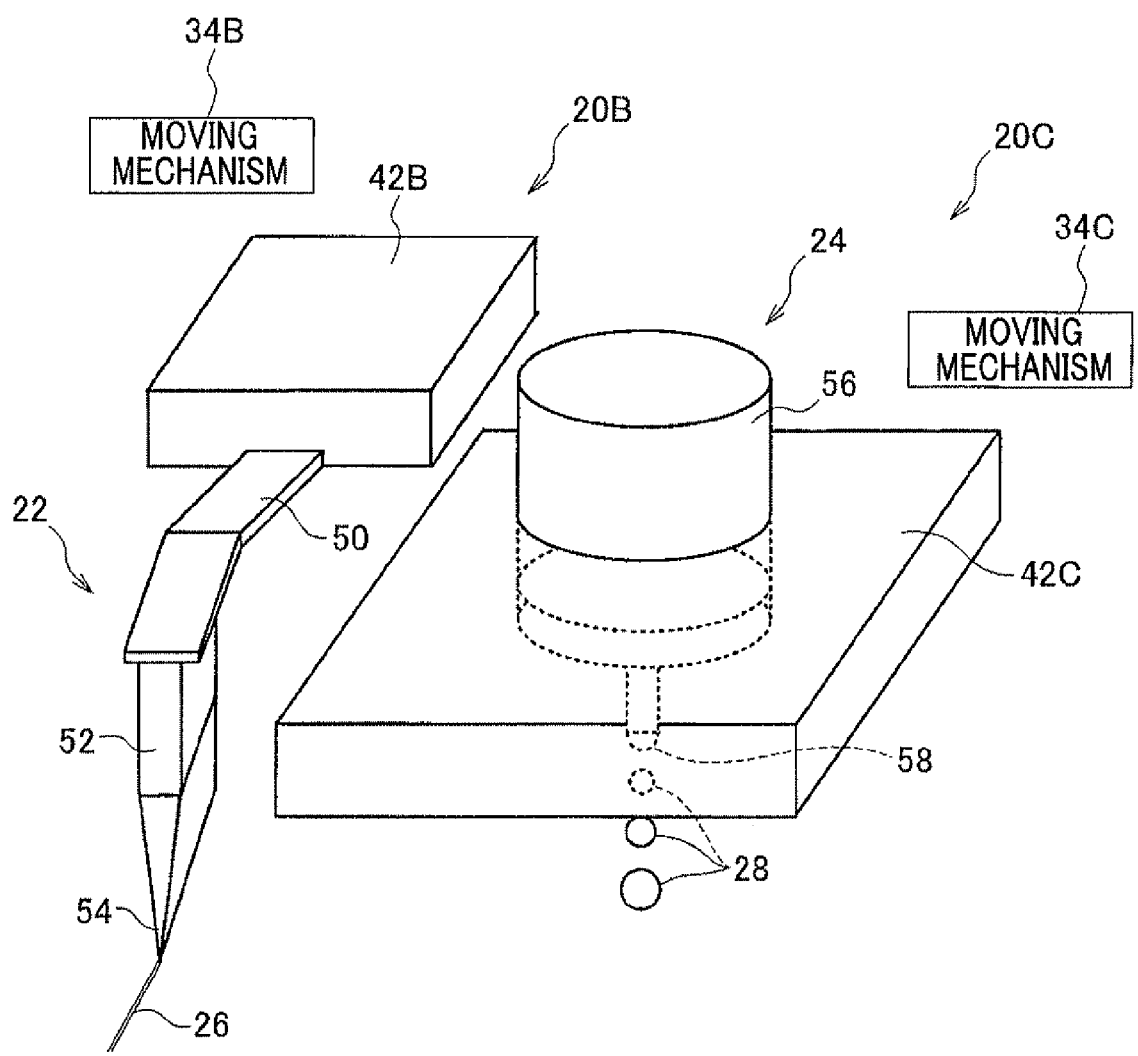
FIG. 9 is a perspective view showing another modification of the working head.

Although the working head 20 in which the concave-convex shape forming section 22 and the resin supply section 24 are integrated has been described above, the concave-convex shape forming section 22 and the resin supply section 24 may be separate. FIG. 9 is a perspective view showing another modification of the working head. In the modification shown in FIG. 9, a first working head 20B having the concave-convex shape forming section 22 and a first holding member 42B, and a second working head 20C having the resin supply section 24 and a second holding member 42C are provided. The first working head 20B is moved by a moving mechanism 34B, and the second working head 20C is moved by a moving mechanism 34C. That is, the first working head 20B and the second working head 20C are independently moved, respectively.

Modification of Lens Machining

Although the example in which the workpiece 12 having the resin base 14 and the sheet member 16 is machined has been described above, the resin base 14 may be formed within the process of lens machining. FIGS. 10A to 10D are process views showing a modification of the lens machining.

Figure 10A:
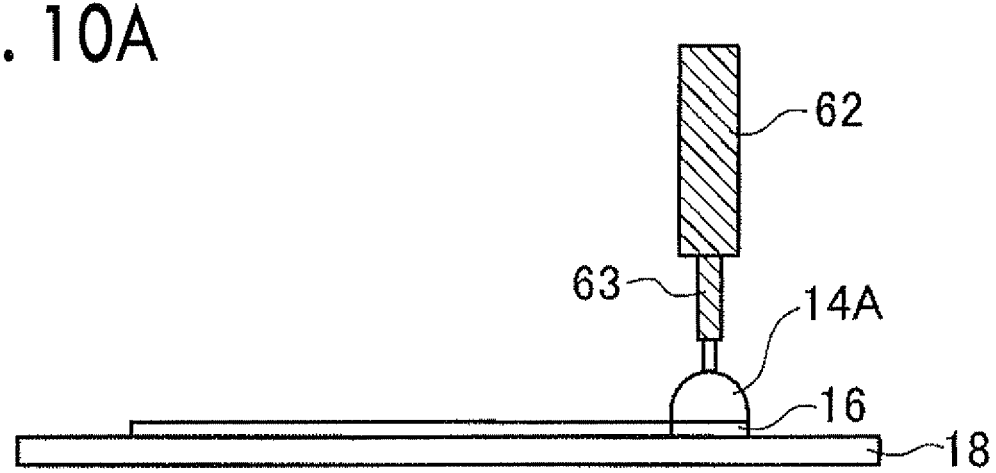
FIGS. 10A to 10D are process views showing a modification of the lens machining.

As shown in FIG. 10A, the working head 20 is moved along the y direction with respect to the sheet member 16 held on the stage 18, and liquid resin 14A is ejected from the ejection port 63 of the resin supply section 62 for a base. A linear resin 14A that extends in the y direction is formed.

Figure 10B:
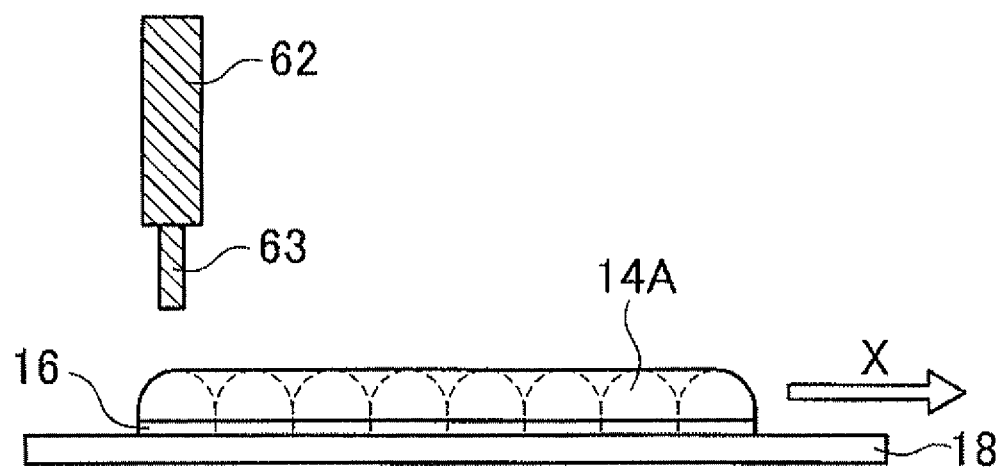

As shown in FIG. 10B, the working head 20 is moved sequentially along the x direction and the y direction with respect to the sheet member 16 held on the stage 18, to form the plural resins 14A arrayed in the x direction. The plural linear resins 14A are integrated to form a resin 14A with the same shape as the resin base 14. Movement of the working head 20 and supply of the resin 14A from the resin supply section 62 for a base are repeated until the resin 14A with the same shape as the resin base 14 is formed.

Figure 10C:
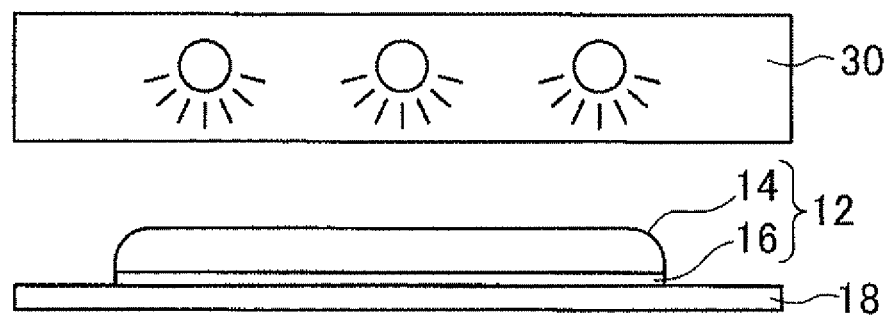
Figure 10D:
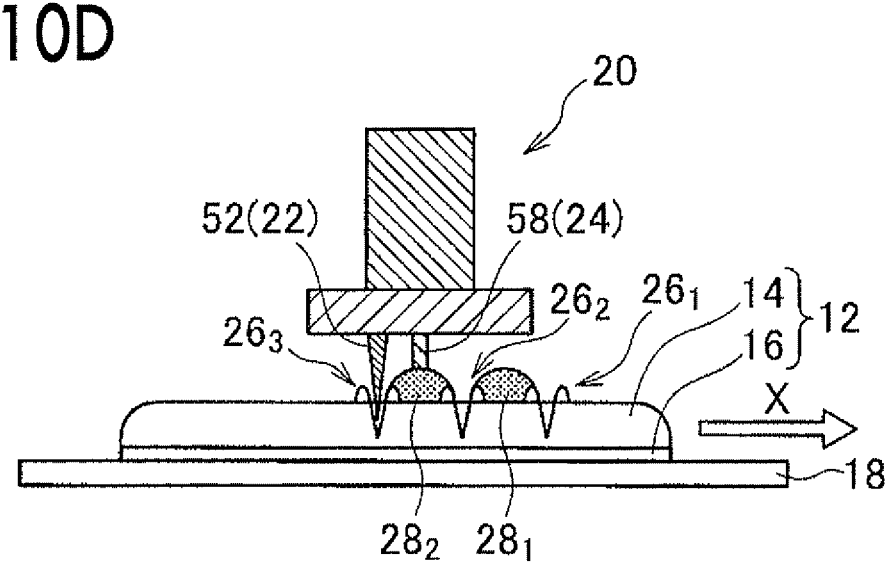

As shown in FIG. 10C, the sheet member 16 held on the stage 18 is moved to a position that faces the light irradiation section 30, and the resin 14A on the sheet member 16 is irradiated with curing light. The resin 14A is cured to form the resin base 14. As shown in FIG. 10D, the workpiece 12 having the resin base 14 and the sheet member 16 is processed similarly to the lens machining shown in FIGS. 5A to 5D.

In addition, although the resin 14A on the sheet member 16 is cured to form the resin base 14 in the above modification of the lens machining, the sheet member 16 on which a non-cured resin 14A is formed may be used as the workpiece 12. A base made of the non-cured resin 14A is in a softer state than the resin base 14 after curing. Accordingly, the notches 26 are formed on the base in a state where the base is soft.

In a case where the non-cured resin 14A is machined, as compared to the case where the resin base 14 after curing is machined, a force required for formation of the notches 26 becomes small. Thereby, the processing speed by the concave-convex shape forming section 22 becomes fast, and the lifetime of the cutting blade 52 becomes long. In addition, the degree of curing of the resin 14A may be adjusted so that the resin base 14 after curing has moderate softness.

In addition, although the example in which the photocurable resin is used as the material that forms the lenses and the resin base has been described above, thermoplastic resin or thermosetting resin may be used. In a case where the thermoplastic resin is used, the resin is thermally melted by heating to give flowability and capability for being ejected. In a case where the thermosetting resin is used, the resin is thermally cured by heating. Additionally, in order to suppress the reflective loss of light produced at the interface between the lenses and the resin base, the material of each member may be selected so that a difference in refractive index between the lens and the resin bases is made small.

Second Exemplary Embodiment

Lens Manufacturing Apparatus

Figure 11:
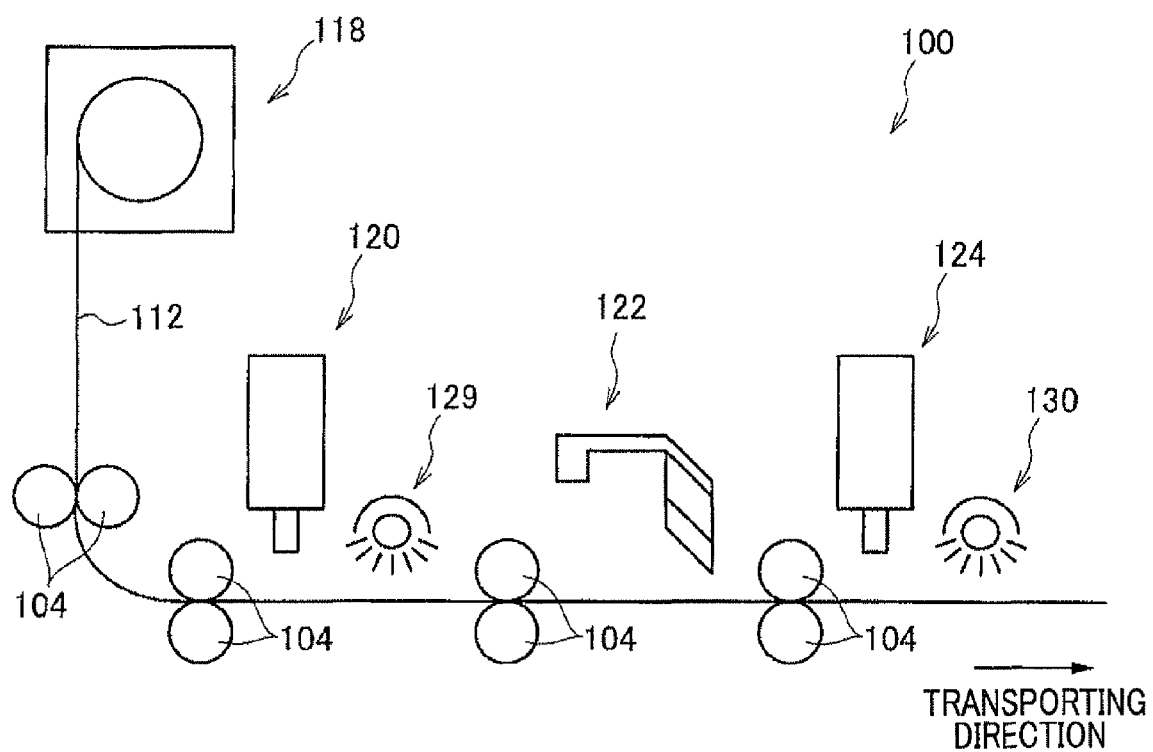
FIG. 11 is a schematic view showing the configuration of a lens manufacturing apparatus related to a second exemplary embodiment.
Figure 12:
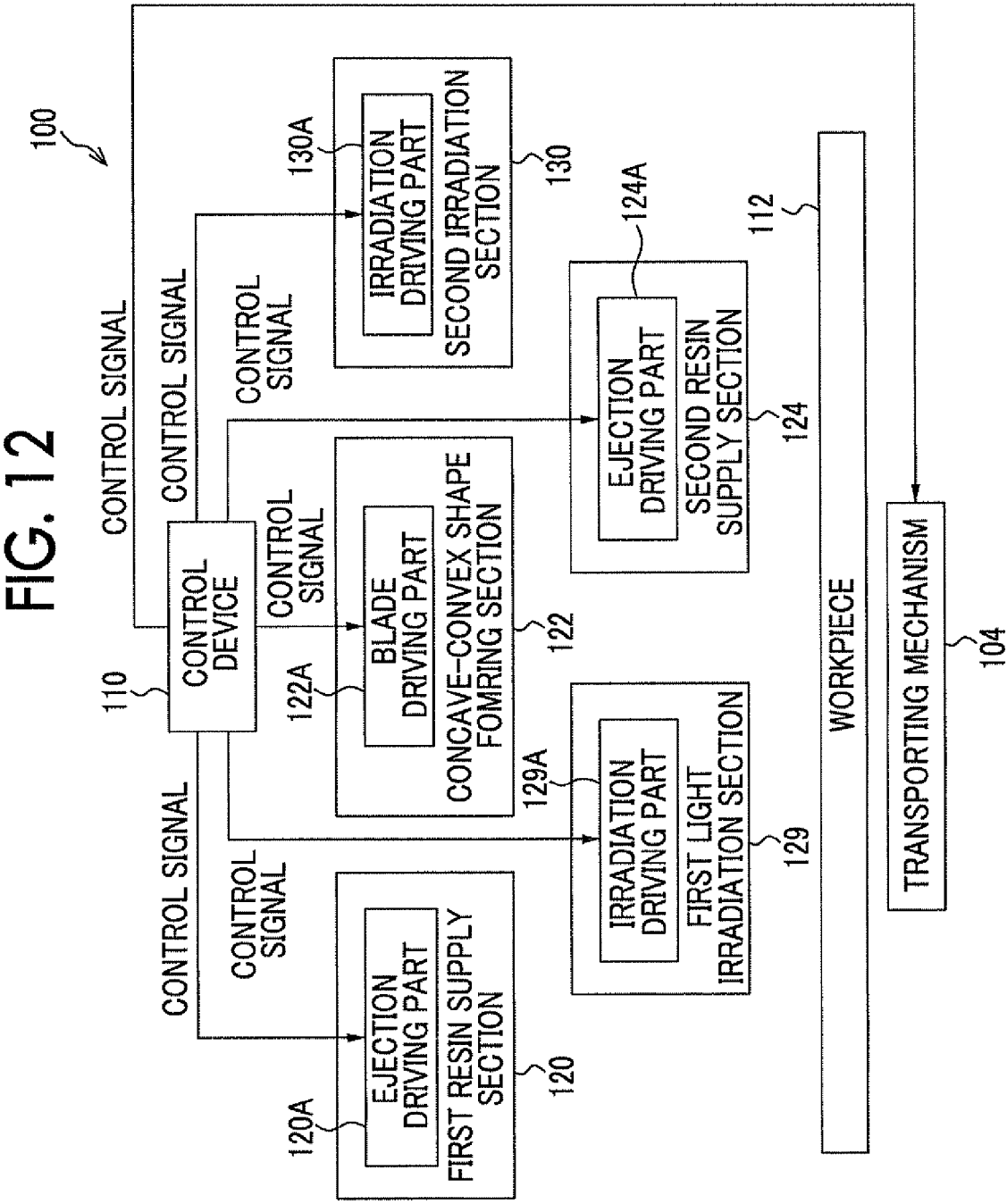
FIG. 12 is a block diagram showing an electrical configuration of the lens manufacturing apparatus related to the second exemplary embodiment.

A lens manufacturing apparatus related to a second exemplary embodiment of the invention will be described. FIG. 11 is a schematic view showing the configuration of the lens manufacturing apparatus related to the second exemplary embodiment. FIG. 12 is a block diagram showing an electrical configuration of the lens manufacturing apparatus related to the second exemplary embodiment.

As shown in FIG. 11, a lens manufacturing apparatus 100 includes a supply section 118 that continuously supplies a belt-shaped sheet member that is a workpiece 112, a transporting mechanism 104 that transports the supplied workpiece 112, a first resin supply section 120 that supplies resin for a base onto the workpiece 112, a first light irradiation section 129 that irradiates the workpiece 112 with curing light, an concave-convex shape forming section 122 that makes a notch 26 in the surface of the workpiece 112 to form an concave-convex shape portion, a second resin supply section 124 that supplies the resin for a lens onto the workpiece 112, and a second light irradiation section 130 that irradiates the workpiece 112 with curing light.

In the present exemplary embodiment, the first resin supply section 120, the first light irradiation section 129, the concave-convex shape forming section 122, the second resin supply section 124, and the second light irradiation section 130 are arranged at predetermined positions in this order from upstream along the transporting direction shown by an arrow. The workpiece 112 supplied from the supply section 118 is transported in the transporting direction shown by the arrow by the transporting mechanism 104. The workpiece 112 reaches the first resin supply section 120, the first light irradiation section 129, the concave-convex shape forming section 122, the second resin supply section 124, and the second light irradiation section 130 in this order, respectively, and is processed by the respective sections.

As shown in FIG. 12, the first resin supply section 120 includes an ejection driving part 120A for ejecting liquid resin by voltage application or the like. The first light irradiation section 129 includes an irradiation driving part 129A for radiating curing light by turning on of a light source, or the like. The concave-convex shape forming section 122 includes a blade driving part 122A for driving a cutting blade to form an concave-convex shape portion. The blade driving part 122A moves plural cutting blades in a processing direction (the z direction). The second resin supply section 124 includes an ejection driving part 124A for ejecting liquid resin by voltage application or the like. The second light irradiation section 130 includes an irradiation driving part 130A for irradiating curing light by turning on of a light source, or the like.

The ejection driving part 120A, the irradiation driving part 129A, the blade driving part 122A, the ejection driving part 124A, the irradiation driving part 130A, and the transporting mechanism 104 are electrically connected to the control device 110, respectively. Similarly to the first exemplary embodiment, the control device 110 includes a CPU, a ROM, a RAM, a nonvolatile memory, an I/O, or the like and is constituted as a computer that performs the control and various operations of the overall apparatus. Each of the ejection driving part 120A, the irradiation driving part 129A, the blade driving part 122A, the ejection driving part 124A, the irradiation driving part 130A, and the transporting mechanism 104 drive an object on the basis of a control signal from the control device 110.

Configuration of Lens Machining Section

Main components of a lens machining section will be specifically described. Here, the main components of the lens machining section are the concave-convex shape forming section 122 that makes a notch 126 in the surface of the workpiece 112 to form an concave-convex shape portion, and the second resin supply section 124 that supplies resin for a lens onto the workpiece 112. The workpiece 112 is supplied to the concave-convex shape forming section 122 in a state where a resin base 114 is already formed. In a case where it is not necessary to distinguish particularly, the workpiece 112 in which the resin base 114 is formed is generally referred to as the "workpiece 112".

Figure 13:
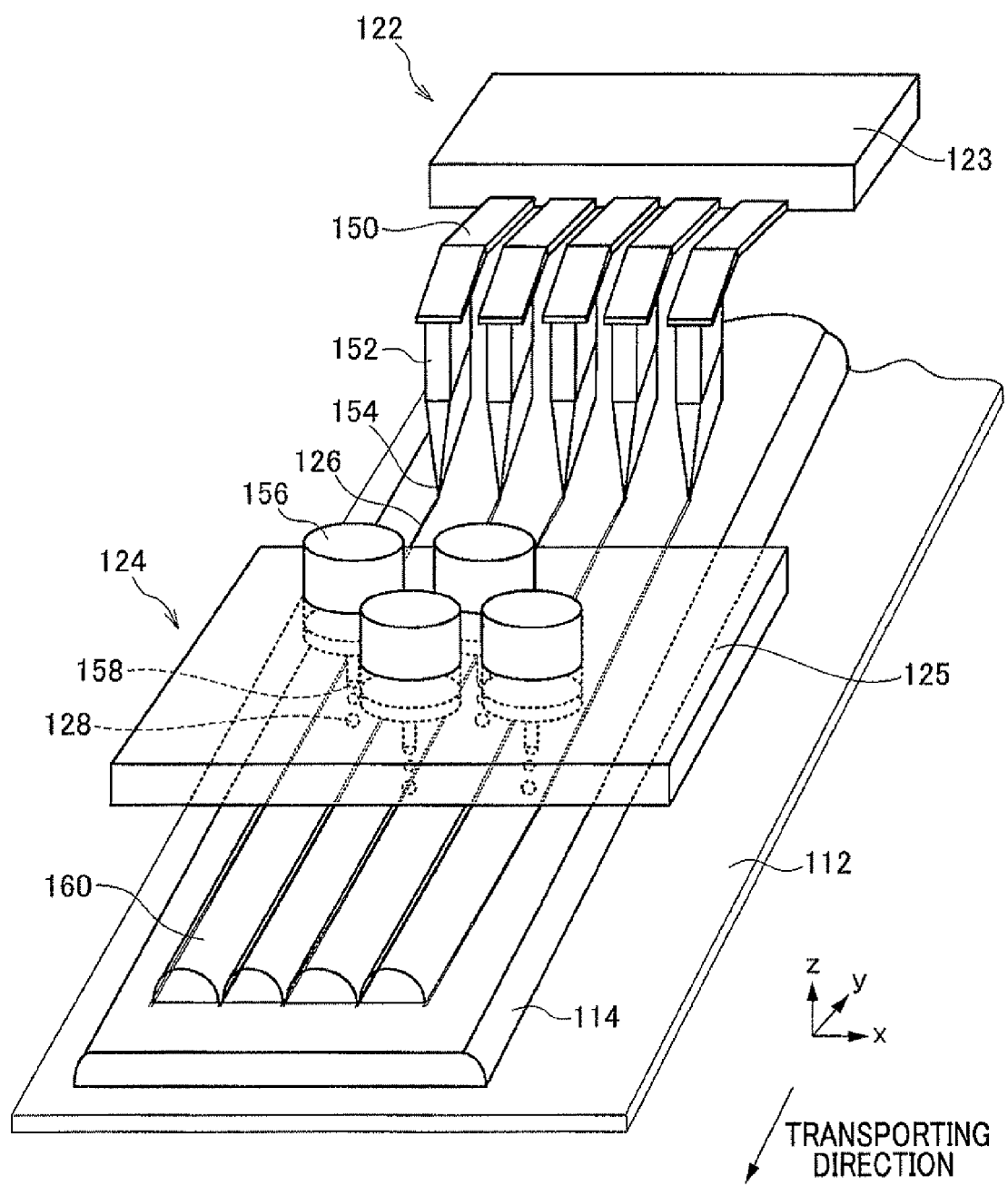
FIG. 13 is a perspective view showing an example of the configuration of a lens machining section.

FIG. 13 is a perspective view showing an example of the main components of the lens machining section of the lens manufacturing apparatus. As shown in FIG. 13, in the present exemplary embodiment, the concave-convex shape forming section 122 includes plural cutting blades 152. In FIG. 13, an example in which the concave-convex shape forming section includes five cutting blades 152 is shown. In addition, the number of the cutting blades 152 is not limited to the illustrated number. The plural cutting blades 152 are arrayed along a direction (x direction) intersecting the transporting direction (−y direction). The arrangement interval (pitch) between the plural cutting blades 152 is set according to the interval in the x direction between two adjacent notches 126, or the like.

Each of the plural cutting blades 152 is supported by a supporting portion 150 so that the length direction (the direction of the blade) of a blade tip 154 faces the y direction. The supporting portion 150 is constituted by a rod-shaped or belt-shaped member having elasticity, such as a plate spring. The supporting portion 150 has one end connected to a holding member 123. The concave-convex shape forming section 122 moves the plural cutting blades 152 in the processing direction (the z direction) by the blade driving part 122A shown in FIG. 12.

As each of the plural cutting blades 152 is supported by the supporting portion 150, a blade tip 154 comes into contact with the surface of the workpiece 112. As the workpiece 112 moves in the transporting direction, the surface of the workpiece 112 is pulled and cut by the plural cutting blades 152, and plural notches 126 that extend in the y direction are formed at one time. The plural notches 126 are formed at predetermined intervals in the surface of the workpiece 112.

Additionally, in the present exemplary embodiment, the second resin supply section 124 includes plural resin holding containers 156. In FIG. 13, an example in which the resin supply section includes four resin holding containers 156 is shown. Each of the plural resin holding containers 156 includes the ejection port 158 that ejects the resin 128. The ejection port 158 communicates with the resin holding container 156, and the resin 128 held in the resin holding container 156 is ejected to the outside through the ejection port 158. Each of the plural resin holding containers 156 is held by a holding member 125 so that the ejection port 158 faces the surface of the workpiece 112.

The plural resin holding containers 156 are arrayed along the direction (x direction) intersecting the transporting direction (−y direction) so that the resin 128 is supplied from the ejection port 158 between the adjacent notches 126. The arrangement positions of the plural ejection ports 158 are set according to the arrangement interval (pitch) of the plural cutting blades 152, the interval in the x direction between two adjacent notches 126, or the like. For example, the ejection port 158 of the resin holding container 156 is arranged so as to face the center in the x direction between two adjacent notches 126.

The second resin supply section 124 is driven by the ejection driving part 124A shown in FIG. 12, ejects the liquid resin 128 from each of the plural ejection ports 158, and supplies the resin 128 onto the surface of the workpiece 112. The resin 128 is supplied between two adjacent notches 126. The supplied resin 128 rises in the shape of a semi-columnar lens 160 that extends in the y direction.

Lens Machining

Next, lens machining using the above lens manufacturing apparatus will be described. FIGS. 14A to 14E are cross-sectional views showing respective processes carried out in the lens machining.

(1) Base Forming Process

Figure 14A:
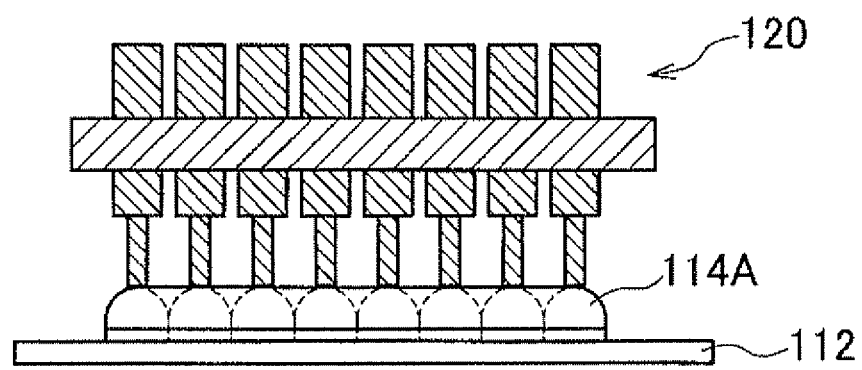
FIGS. 14A to 14E are cross-sectional views showing respective processes carried out in lens machining.

As shown in FIG. 14A, the workpiece 112 is supplied to the first resin supply section 120. If the workpiece 112 is supplied, liquid resin 114A is supplied from the first resin supply section 120 to form plural linear resins 114A that extend in the y direction. The plural linear resins 114A are integrated to form a resin 114A with the same shape as the resin base 114.

(2) Curing Process

Figure 14B:
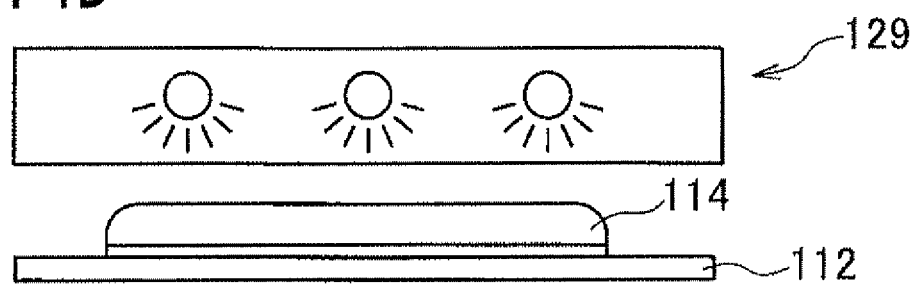

As shown in FIG. 14B, the workpiece 112 in which the resin 114A is formed is supplied to the first light irradiation section 129. If the workpiece 112 is supplied, the resin 114A is irradiated with curing light from the first light irradiation section 129. The resin 114A is cured to form the resin base 114.

(3) Convex Portion Forming Process

Figure 14C:
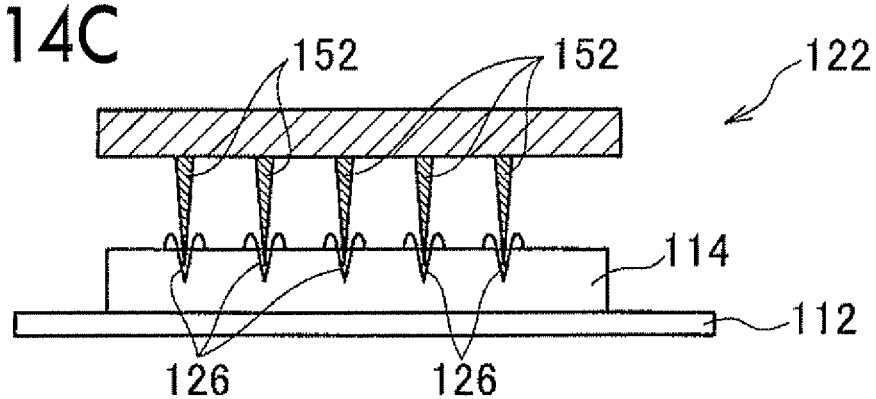

As shown in FIG. 14C, the workpiece 112 in which the resin base 114 is formed is supplied to the concave-convex shape forming section 122. If the workpiece 112 is supplied, the plural cutting blades 152 are driven by the blade driving part 122A of the concave-convex shape forming section 122, and the blade tips 154 of the plural cutting blades 152 are brought into contact with the surface of the workpiece 112. The surface of the workpiece 112 is pulled and cut by the movement of the workpiece 112, and plural notches 126 that extend in the y direction are formed at one time.

(4) Lens Forming Process

Figure 14D:
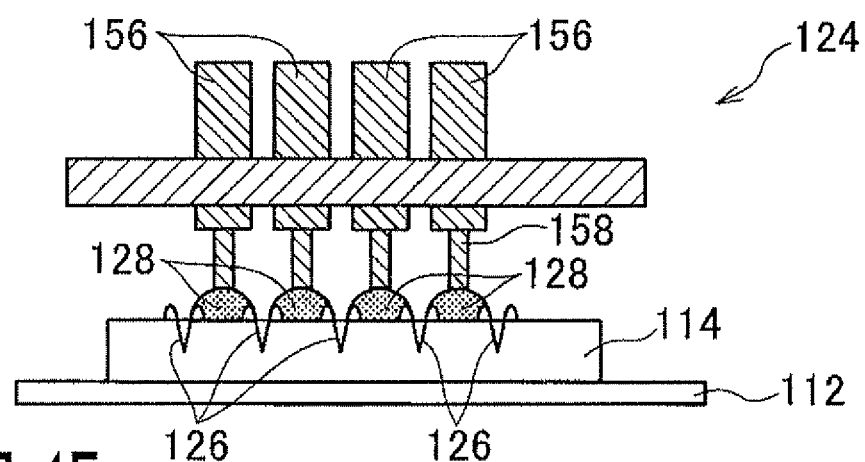

As shown in FIG. 14D, the workpiece 112 in which the plural notches 126 are formed is supplied to the second resin supply section 124. If the workpiece 112 is supplied, the ejection driving part 124A of the second resin supply section 124 is driven to eject the liquid resin 128 from the second resin supply section 124. Thereby, the resin 128 is supplied between adjacent notches 126, and plural linear resins 128 that extend in the y direction are formed at one time. Each of the supplied resins 128 rises in the shape of a semi-columnar lens 160.

(5) Curing Process

Figure 14E:
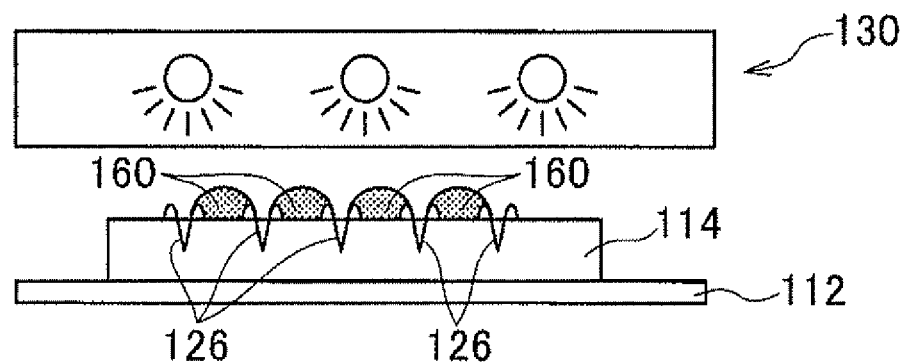

As shown in FIG. 14E, the workpiece 112 in which the plural resin 128 are formed is supplied to the second light irradiation section 130. If the workpiece 112 is supplied, the plural resins 128 are irradiated with curing light from the second light irradiation section 130. The plural resins 128 are cured, respectively, to form plural lenses 160 at one time.

Figure 15:
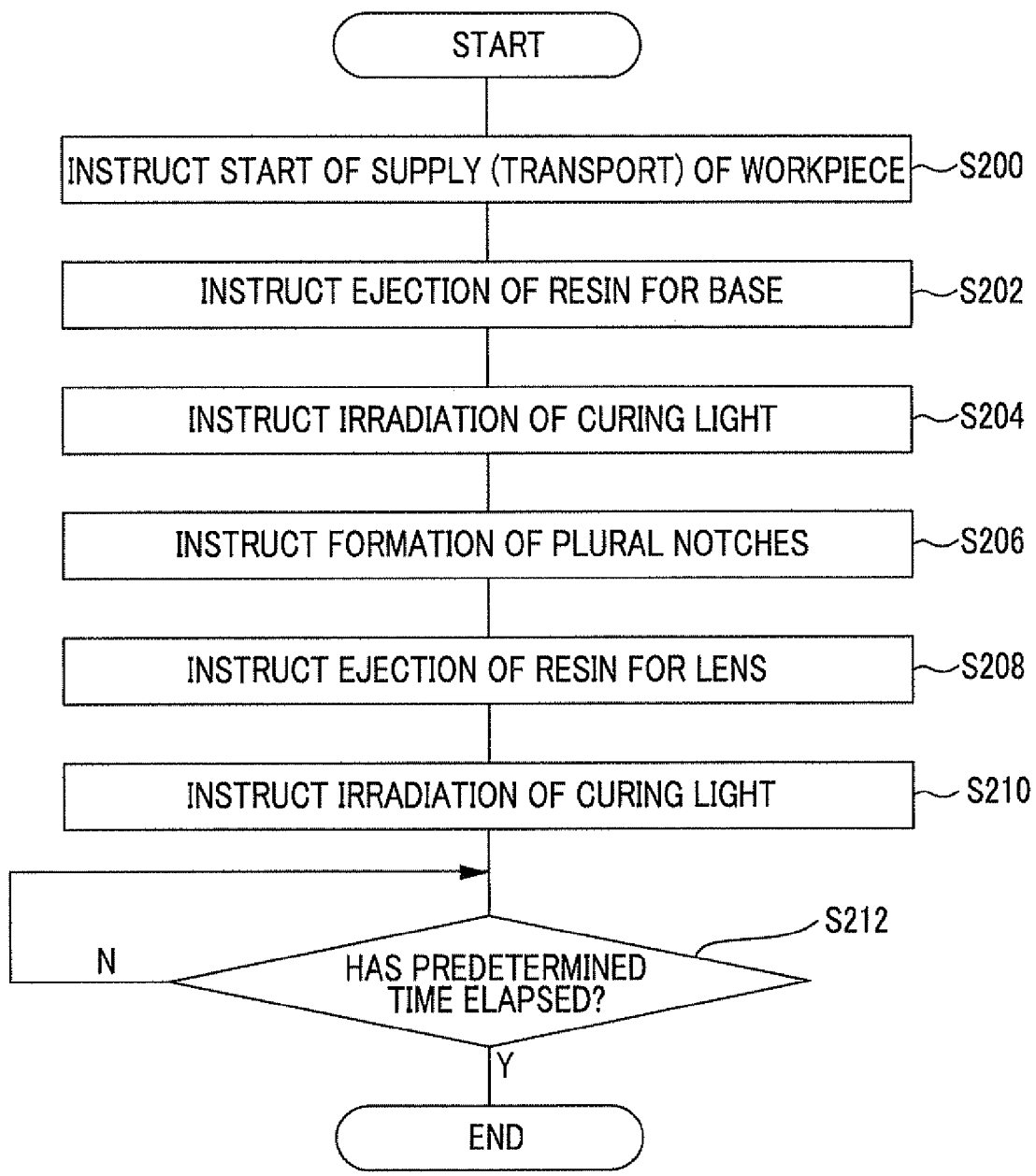
FIG. 15 is a flowchart showing a procedure of the lens machining.

The procedure of the lens machining is stored in the storage unit of the control device 110 as a control program of the lens manufacturing apparatus. The control program is read from the storage unit and executed by a CPU of the control device 110. FIG. 15 is a flowchart showing the procedure of the lens machining.

The lens machining is started if the start of the processing is instructed by an operator. Here, an example in which n notches 162 that are lined up in the x direction are formed, and (n−1) lenses 160 are formed will be described.

In Step 200, the transporting mechanism 104 is instructed so that the workpiece 112 is supplied to the first resin supply section 120 from the supply section 118. The transporting mechanism 104 takes out the workpiece 112 from the supply section 118, transports the workpiece 112 in the −y direction along the transporting path, and supplies the workpiece 112 to the first resin supply section 120.

For example, the workpiece 112 is transported at a predetermined speed, and reaches the respective sections including the first resin supply section 120 at a predetermined timing. Otherwise, a sensor that senses the workpiece 112 at the respective sections may be provided to detect arrival of the workpiece 112. Description will be made below supposing that a processing routine ends if the workpiece reaches the respective sections at a predetermined timing and a predetermined time has lapsed.

In Step 202, the ejection driving part 120A of the first resin supply section 120 is instructed so that the resin 114A is ejected to the supplied workpiece 112 from the first resin supply section 120. The ejection driving part 120A causes the liquid resin 114A to be ejected from each of the plural ejection ports, and forms plural linear resins 114A that extend in the y direction, on the surface of the workpiece 112.

In Step 204, the irradiation driving part 129A is instructed so that the supplied workpiece 112 is irradiated with curing light from the first light irradiation section 129. The irradiation driving part 129A turns on and drives the light source of the first light irradiation section 129, and irradiates the workpiece 112, in which the resins 114A are formed, with curing light, to cure the resins 114A.

In Step 206, the blade driving part 122A of the concave-convex shape forming section 122 is instructed so that plural notches 126 are formed in the supplied workpiece 112. The blade driving part 122A lowers each of the plural cutting blades 152 along the z direction so that the blade tip 154 comes into contact with the workpiece 112. The surface of the cured resin 114 is pulled and cut by the transport movement of the workpiece 112, and the plural notches 126 that extend in the y direction are formed at one time.

In Step 208, the ejection driving part 124A of the second resin supply section 124 is instructed so that the resin 128 is ejected to the supplied workpiece 112 from the second resin supply section 124. The ejection driving part 124A causes the liquid resin 128 to be ejected from each of the plural ejection ports, and supplies the resin 128 between adjacent notches 162 on the surface of the workpiece 112. Thereby, plural linear resins 128 that extend in the y direction are formed.

In Step 210, the irradiation driving part 130A is instructed so that the supplied workpiece 112 is irradiated with curing light from the second light irradiation section 130. The irradiation driving part 130A turns on and drives the light source of the second light irradiation section 130, and irradiates the workpiece 112, in which the plural resins 128 are formed, with curing light, to cure each of the plural resins 128. Thereby, plural lenses 160 are formed at one time.

In Step 212, it is determined whether or not a predetermined time has lapsed. If the predetermined time doesn't have lapsed, the determination is repeated, and if the predetermined time has lapsed, the routine is ended.

Although the example in which the first resin supply section 120, the concave-convex shape forming section 122, and the second resin supply section 124 are fixed and arranged, respectively, has been described above, moving mechanisms that move the respective sections may be provided so as to move the respective sections in the direction (x direction) intersecting the transporting direction. By moving the respective sections, the position of the lenses 160 to be formed becomes variable (may be changed), and the degree of freedom in design is improved. For example, in a case where the workpiece 112 is a sheet member in which a parallax image for stereoscopic vision and a two-dimensional image are formed, the respective sections may be moved so that lenses are formed only on the parallax image for stereoscopic vision.

Additionally, the interval of the cutting blades 152 of the concave-convex shape forming section 122, and the interval of the ejection ports 158 of the second resin supply section 124 may be made variable, respectively. By making these intervals variable, the arrangement interval of the lenses 160 may be made variable and the degree of freedom in design improved. In order to make the respective intervals variable, for example, each of the concave-convex shape forming section 122 and the second resin supply section 124 may be rotated with respect to the z axis (rotational axis that extends in the z direction), and the intervals of the cutting blades 152 and the ejection ports 158 in the x direction are changed. The cutting blades to be used at this time are preferably needle-shaped blades (refer to FIG. 24).

Array Form of Plural Cutting Blades

Figure 16A:
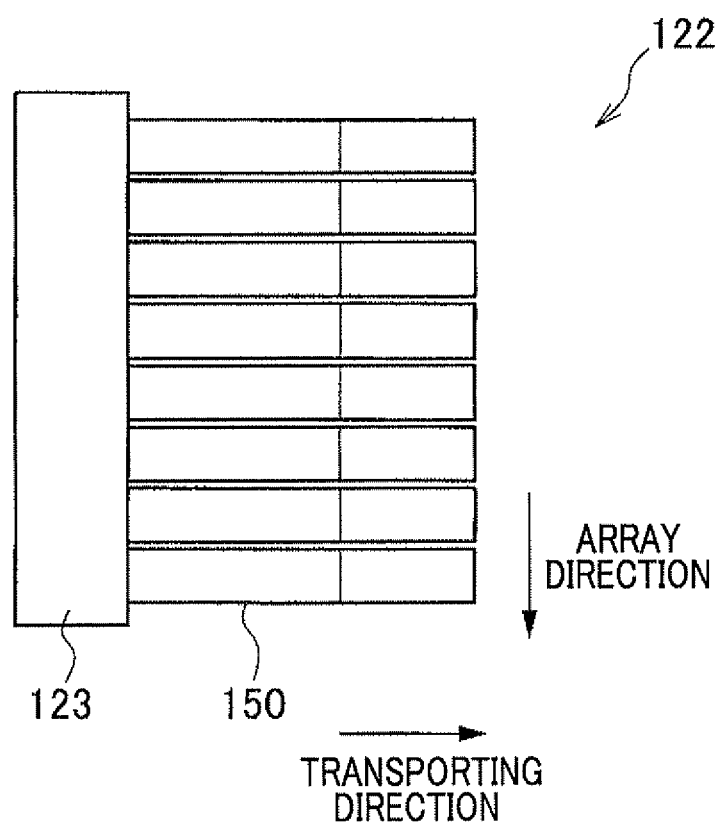
FIGS. 16A to 16C show an example of an array form of plural notch portions.
Figure 16B:
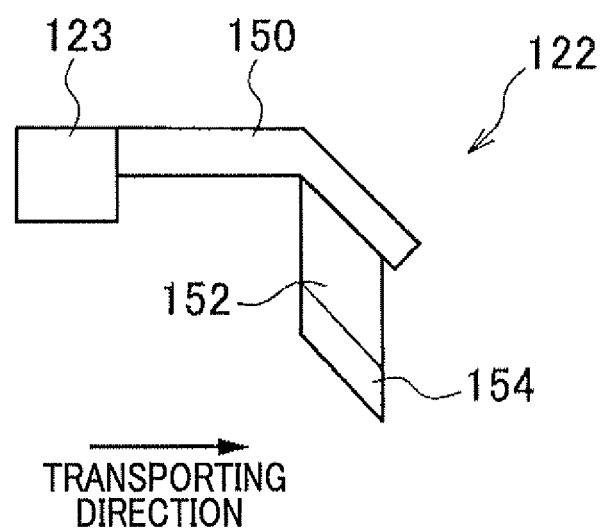
Figure 16C:
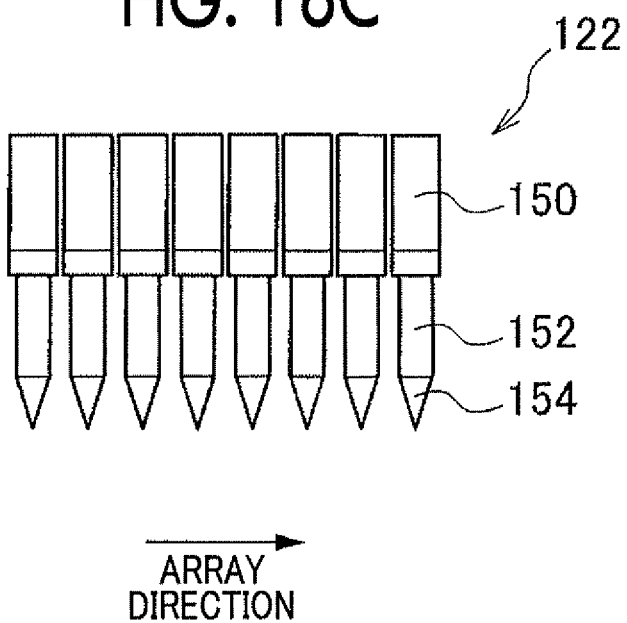

FIGS. 16A to 16C are views showing an example of an array form of plural cutting blades. FIG. 16A is a plan view, FIG. 16B is a side view, and FIG. 16C is a front view. As shown in FIGS. 16A to 16C, in the present exemplary embodiment, the concave-convex shape forming section 122 includes plural cutting blades 152. Each of the plural cutting blades 152 is supported by the long supporting portion 150 having elasticity. The supporting portion 150 has one end connected to the holding member 123. As the long supporting portion 150 having elasticity, a metallic plate spring may be used.

The plural cutting blades 152 are aligned, respectively, so that the length direction (the direction of the blades) of the blade tips 154 faces the y direction, and are arrayed so as to be lined up in the direction (x direction) intersecting the transporting direction (−y direction). Accordingly, the distal ends of the plural blade tips 154 are arranged on a line that extends in the y direction. The arrangement interval (pitch) between the plural cutting blades 152 is set according to the interval in the x direction between two adjacent notches 126, or the like. In this example, the width of the cutting blades 152 in the x direction is 0.2 mm and the pitch of the plural cutting blades 152 is 0.25 mm. Plural notches 126 are formed at the same interval as the pitch of the plural cutting blades 152.

Figure 17:
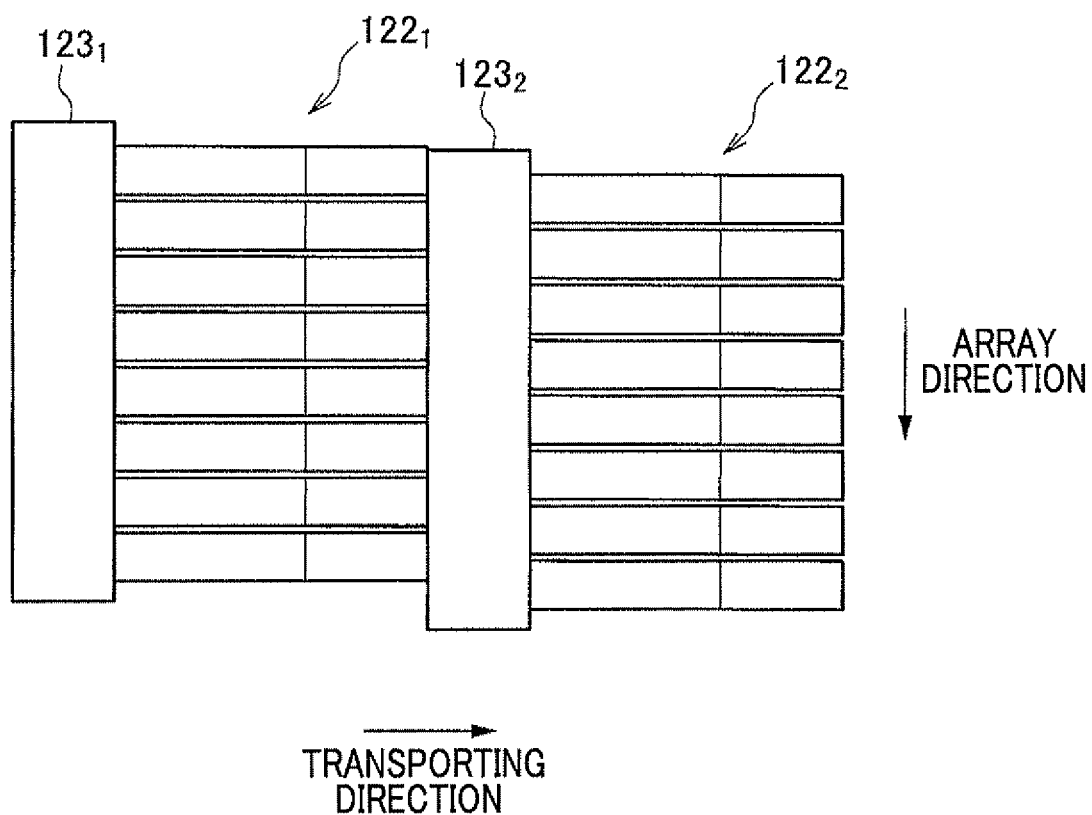
FIG. 17 is a view showing another example of an array form of plural cutting blades.

FIG. 17 is a drawing showing another example of an array form of plural cutting blades. In the example shown in FIG. 17, plural (two in the drawing) concave-convex shape forming sections are arranged such that the positions thereof are offset from each other. An concave-convex shape forming section $122_1$ including the plural cutting blades 152 and a holding member $123_1$ and an concave-convex shape forming section $122_2$ including the plural cutting blades 152 and a holding member $123_2$ are arranged such that the positions thereof are offset from each other so as not to overlap each other in the transporting direction.

Additionally, the concave-convex shape forming sections are arranged such that the positions thereof are offset from each other also in the direction intersecting the transporting direction by a distance of half of the pitch of the plural cutting blades 152 so that a cutting blade 152 of the concave-convex shape forming section $122_2$ is arranged between adjacent cutting blades 152 of the concave-convex shape forming section $122_1$. By arranging the plural concave-convex shape forming sections 122 so as to be offset from each other, plural notches 126 are formed at intervals narrower than the pitch of the plural cutting blades 152.

Modification of Cutting Blade

Figure 18A:
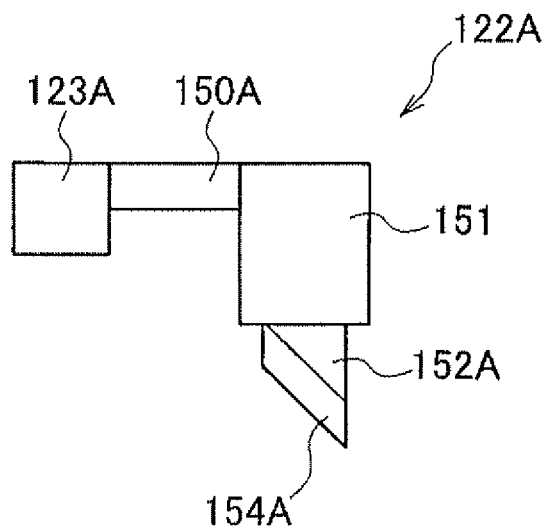
FIGS. 18A and 18B are cross-sectional views showing modifications of the cutting blade.
Figure 18B:
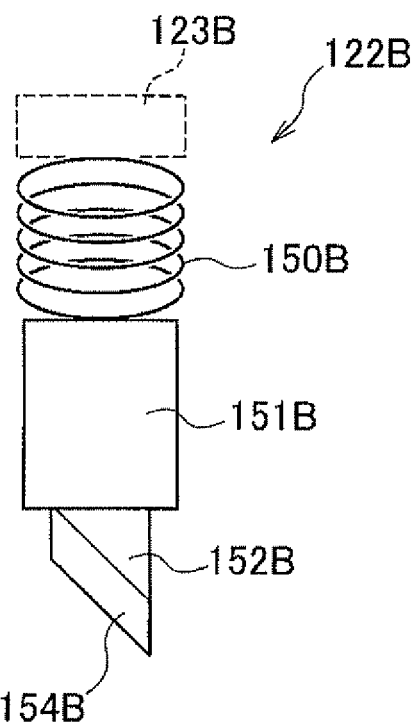

FIGS. 18A and 18B are cross-sectional views showing modifications of the cutting blade. Although the cutting blade 152 supported by the long supporting portion 150 having elasticity is illustrated, the form of the cutting blade is not necessarily limited to this. As shown in FIG. 18A, the root of the cutting blade 152 may be fixed by attaching a fixing portion 151 to one end of the supporting portion 150. The fixing portion 151 pinches the root of the cutting blade 152 to fix the root by bonding or the like. Additionally, as shown in FIG. 18B, a spring type helical spring may be used for a supporting portion 150B instead of the supporting portions 150, such as a metallic plate spring.

Third Exemplary Embodiment

Figure 19A:
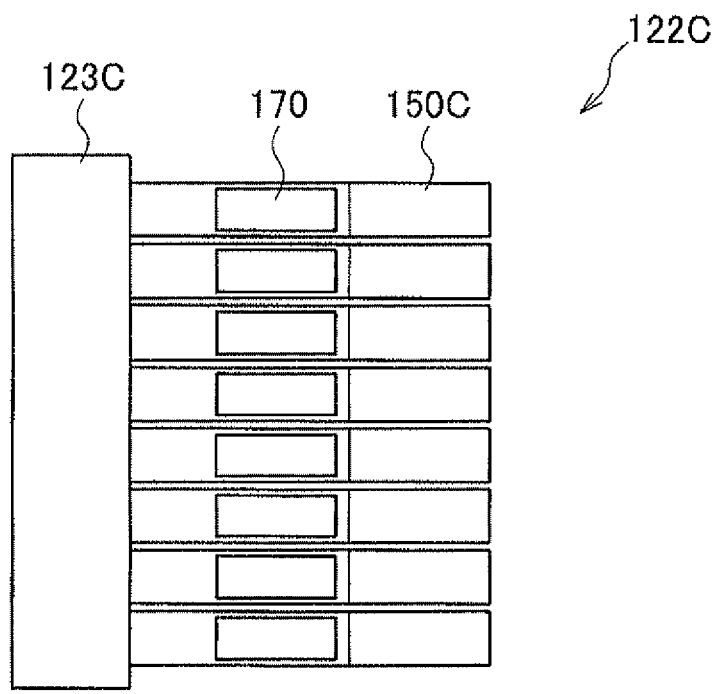
FIGS. 19A and 19B are views showing an array form of plural cutting blades of a lens manufacturing apparatus related to a third exemplary embodiment.
Figure 19B:
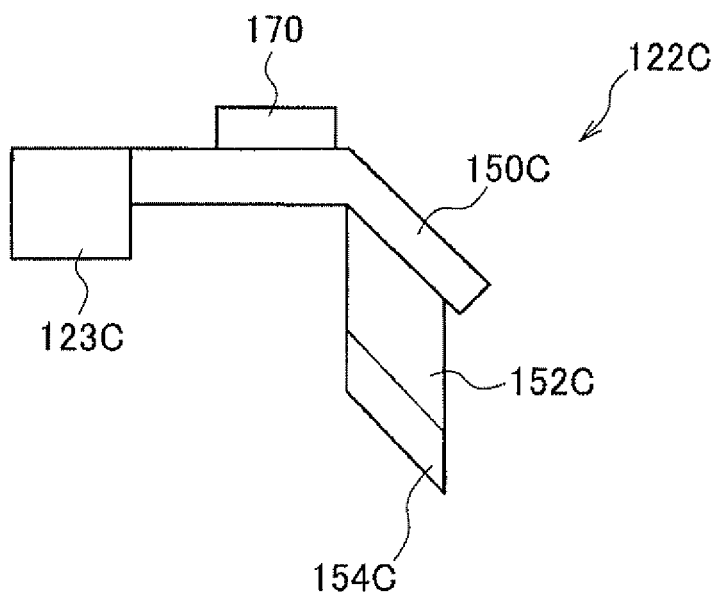

A lens manufacturing apparatus related to a third exemplary embodiment of the invention will be described. FIGS. 19A and 19B are views showing an array form of plural cutting blades of the lens manufacturing apparatus related to the third exemplary embodiment. FIG. 19A is a plan view and FIG. 19B is a side view. Since the lens manufacturing apparatus related to the third exemplary embodiment has the same configuration as the second exemplary embodiment except that plural cutting blades 152C of an concave-convex shape forming section 122C are independently driven, respectively, the description thereof is omitted.

Plural Cutting Blades

In the present exemplary embodiment, the concave-convex shape forming section 122C includes a blade driving part 122A that independently drives each of the plural cutting blades 152C. Each of the plural cutting blades 152C is supported by a long supporting portion 150C having elasticity. One end of the supporting portion 150C is connected to a holding member 123C. The blade driving part 122A includes a driving mechanism 170 that drives the cutting blade 152C. The driving mechanism 170 is attached to the supporting portion 150C and drives the cutting blade 152C. For example, an electromagnet as the driving mechanism 170 is attached to the supporting portion 150, and moves the cutting blade 152c in the z direction by application of an electric field.

By independently driving the plural cutting blades 152C, respectively, a selected cutting blade 152 is moved so that the blade tip 154 approaches the surface of the workpiece 112, and the blade tip 154 is brought into contact with the surface of the workpiece 112 to form a notch 126. On the other hand, the cutting blades 152 that are not selected are moved so that the blade tips 154 are separated from the surface of the workpiece 112.

Lens Machining

Figure 20A:
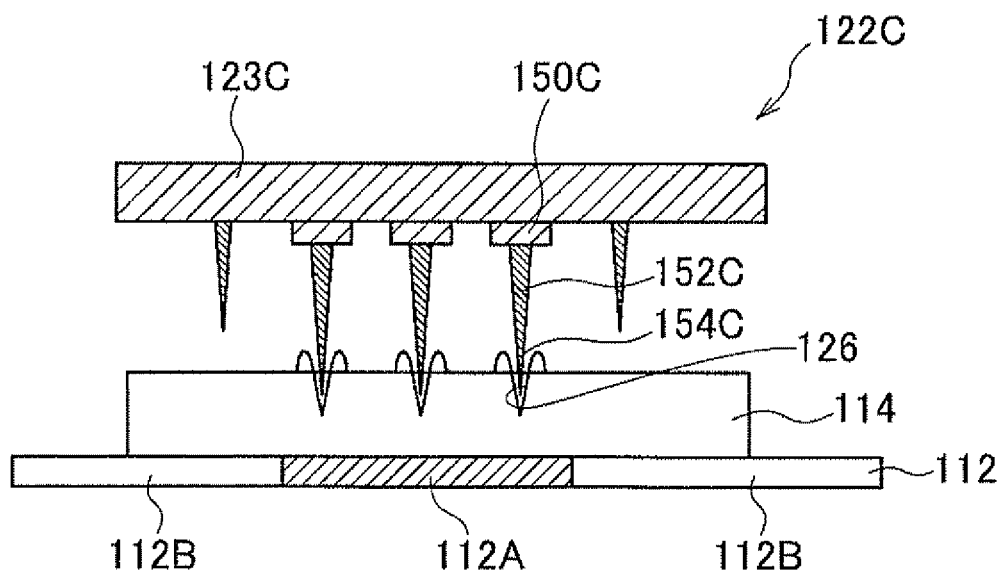
FIGS. 20A and 20B are cross-sectional views showing some processes carried out in the lens machining of the third exemplary embodiment.
Figure 20B:
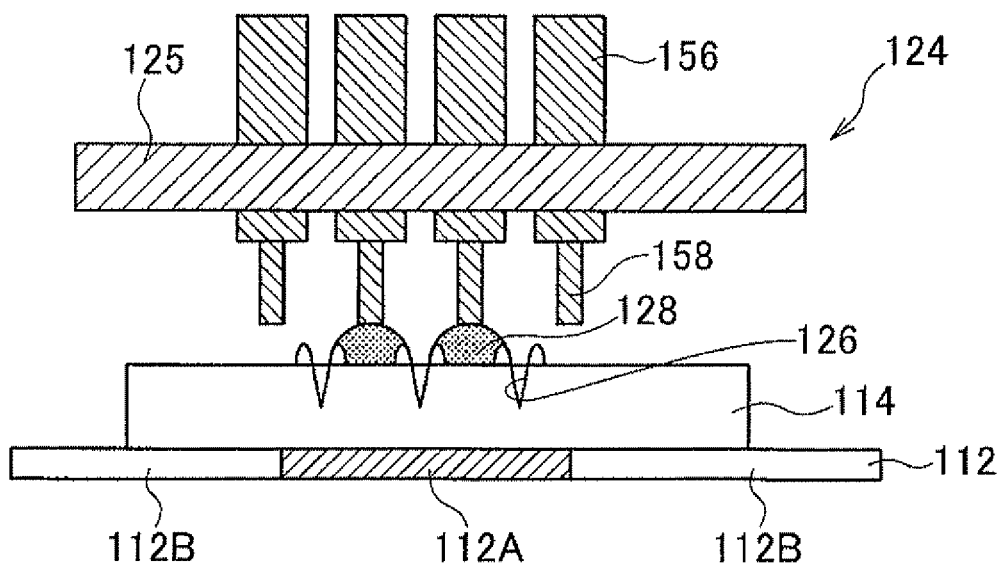

Next, lens machining using the above lens manufacturing apparatus will be described. FIGS. 20A and 20B are cross-sectional views showing some processes carried out in the lens machining of the third exemplary embodiment.

For example, in a case where the workpiece 112 is a sheet member in which a parallax image portion for stereoscopic vision and a two-dimensional image are formed, lenses may be formed on a parallax image portion 112A, and lenses may not be formed on the two-dimensional image portion 112B. As shown in FIG. 20A, in the concave-convex shape forming section 122C, cutting blades 152 present on the parallax image portion 112A are selectively driven, and the blade tips 154 are brought into contacted with the surface of the resin base 114 present on the parallax image portion 112A to form notches 126. On the other hand, the cutting blades 152 present on the two-dimensional image portion 112B are moved so that the blade tips 154 are separated from the surface of the workpiece 112.

In addition, as shown in FIG. 20B, also in the second resin supply section 124, resin 128 is ejected from each ejection port 158 on the parallax image portion 112A, and the resin 128 is supplied. Plural notches 126 are formed in the surface of the resin base 114 on the parallax image portion 112A. The resin 128 is supplied between the adjacent notches 126 from each ejection port 158. On the other hand, the resin 128 is not ejected from each ejection port 158 on the two-dimensional image portion 112B.

Although the example in which lenses are formed on the parallax image portion 112A, and lenses are not formed on the two-dimensional image portion 112B has been described, a region where lenses are to be formed may be freely set. Additionally, the pitch of the plural notches 126 may be changed.

Modifications

Figure 21:
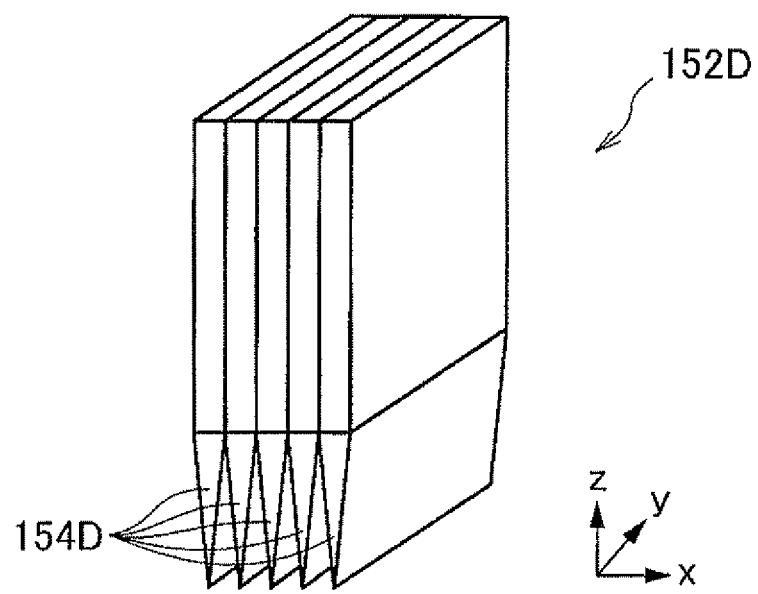
FIG. 21 is a perspective view showing the configuration of a cutting blade related to a modification.

A modification of the cutting blade will be described. FIG. 21 is a perspective view showing the configuration of a cutting blade related to the modification. Since the overall configuration of the lens manufacturing apparatus is the same configuration as the second exemplary embodiment except that the cutting blade is changed to a cutting blade 152D having plural blades, the description thereof is omitted.

Cutting Blade

As shown in FIG. 21, the cutting blade 152D related to the modification is a cutting blade with plural blades, and has plural blade tips 154D. The plural blades of the cutting blade 152D are aligned, respectively, so as to face the y direction, and are arrayed so as to be lined up in the direction (x direction) intersecting the transporting direction (−y direction).

Formation of Convex Portion

Figure 22:
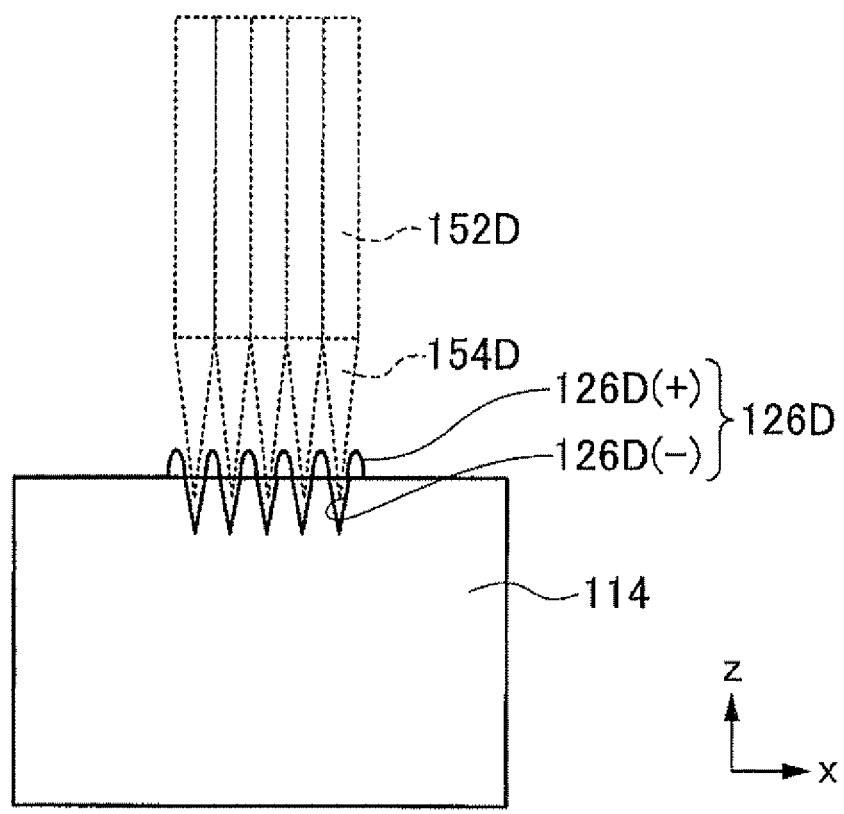
FIG. 22 is a perspective view showing an example of an concave-convex shape portion formed in a workpiece.

The concave-convex shape structure to be formed in a workpiece will be described. FIG. 22 is a perspective view showing an example of an concave-convex shape portion formed in a workpiece. If the cutting blade 152D with plural blades is used, the surface of the workpiece 112 (resin base 114) is pulled and cut by the plural blade tips 154D, and a notch 126D having plural concave portions 126D (−) and plural convex portions 126D (+) will be formed.

Lens Machining

Figure 23A:
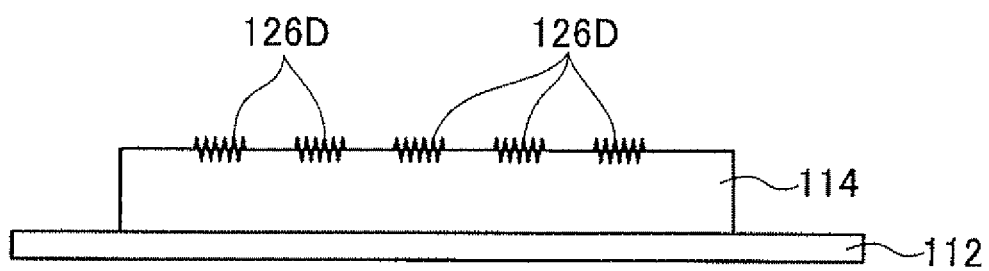
FIGS. 23A and 23B are cross-sectional views showing some processes carried out in lens machining.
Figure 23B:
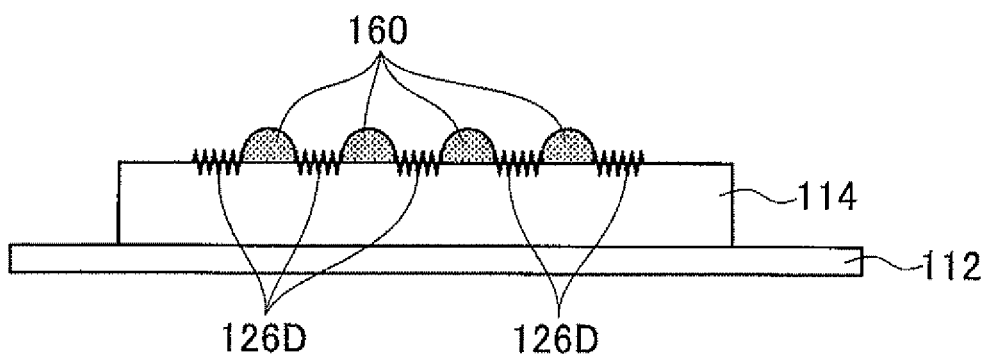

Next, lens machining using the cutting blade related to the modification will be described. FIGS. 23A and 23B are cross-sectional views showing some processes carried out in the lens machining.

As shown in FIG. 23A, the surface of the resin base 114 of the workpiece 112 is pulled and cut by the cutting blade 152D, and plural notches 126D that extend in the y direction are formed at one time. As shown in FIG. 23B, resin 128 is supplied between adjacent notches 126, respectively, and plural linear resins 128 that extend in the y direction are formed at one time. Each of the supplied resins 128 rises in the shape of a semi-columnar lens 160. The resin 128 is cured and becomes a lens 160.

According to the notch 126D having the plural concave portions 126D (−) and the plural convex portions 126D (+), plural convex portions 126D (+) are formed along the flow direction of the resin. Accordingly, even in a case where the flow of the resin 128 in the x direction is not suppressed by a first convex portion 126D (+) where the resin reaches first, the flow of the resin 128 in the x direction is suppressed by the other convex portions 126D (+).

Other Modifications

Figure 24:
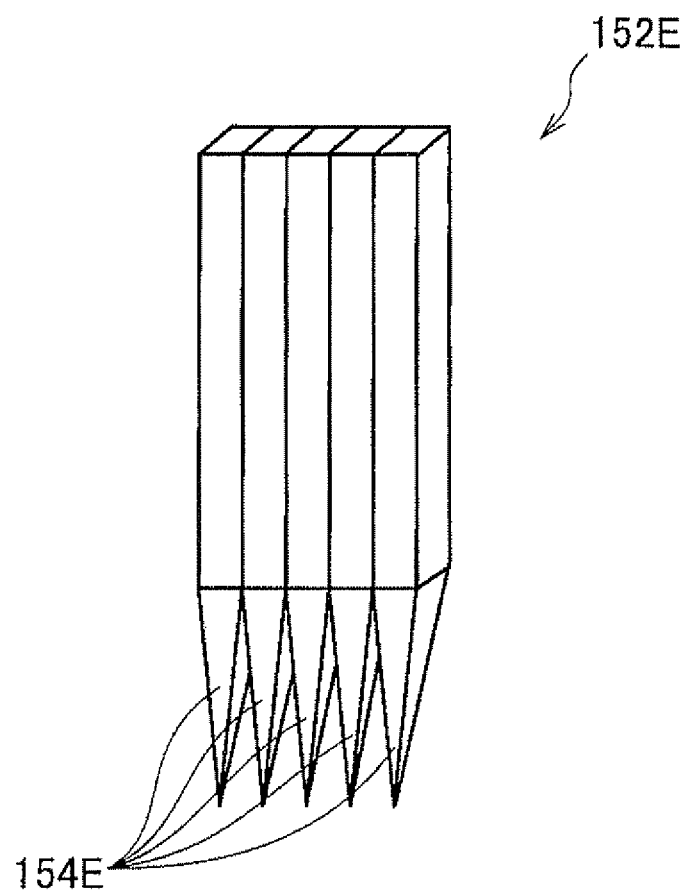
FIG. 24 is a cross-sectional view showing another modification of the cutting blade.

FIG. 24 is a cross-sectional view showing another modification of the cutting blade. Although the cutting blade 152 having the blade tip 154 has been described, the cutting blade is sufficient if a notch can be made, and is not limited to that having the flat blade tip. For example, as shown in FIG. 24 as a modification, a cutting blade 152E having needle-shaped blade tips 154E may be adopted. As illustrated, the cutting blade 152E having plural needle-shaped blade tips 154E (needle-shaped projections) may be adopted.

Applications

In addition, the example in which a stereoscopic display sheet is prepared by forming the resin base 14 and the plural lenses 60 on the sheet member 16 on which a parallax image is formed, using a sheet member on which a parallax image for stereoscopic vision based on a lens array system is formed has been described above. However, the concave-convex shape forming unit of the lens manufacturing apparatus of the exemplary embodiment of the invention may be used for other applications. For example, the technique of changing a light-shielding portion of a stereoscopic display sheet of a parallax barrier system to a diffusing portion to suppress fading is known (see JP-A-07-261119). The concave-convex shape forming unit of the lens manufacturing apparatus of the exemplary embodiment of the invention may be used for formation of this diffusing portion.

Plural notches that become the diffusing portion may be formed by scanning a cutting blade having one blade plural times. In order to form the diffusing portion in a short time, it is preferable to use an concave-convex shape forming unit including a cutting blade having plural blades (array) as shown in FIG. 21 or 24.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A lens manufacturing apparatus comprising:
    a concave-convex shape forming unit that makes a notch in a surface of a workpiece to form a concave-convex shape portion in the surface of the workpiece, the concave-convex shape portion including a concave portion that is deeply cut from the surface of the workpiece, and a convex portion that protrudes from the surface of the workpiece;
    a resin supply unit that supplies resin for the lens onto the surface of the workpiece;
    a resin curing unit that cures the supplied resin for the lens, the resin curing unit being movable independently from the concave-convex shape forming unit and the resin supply unit;
    a moving unit that moves the concave-convex shape forming unit and the resin supply unit relative to the workpiece;
    a working head that has the concave-convex shape forming unit and the resin supply unit,
    wherein the moving unit moves the concave-convex shape forming unit and the resin supply unit by moving the working head; and
    a control unit that controls driving of the concave-convex shape forming unit, the resin supply unit, the resin curing unit, and the moving unit so as to form the concave-convex shape portion extending in a predetermined direction, supplies the resin for the lens between adjacent concave-convex shape portions and cures the supplied resin for the lens.

2. The lens manufacturing apparatus according to claim 1, wherein the concave-convex shape portion has a concave portion that extends in a first direction, and a convex portion that is arranged along an opening edge of the concave portion and protrudes from the surface of the workpiece.

3. The lens manufacturing apparatus according to claim 1, wherein the concave-convex shape forming unit has a cutting blade that brings a blade tip into contact with the surface of the workpiece to make the notch.

4. The lens manufacturing apparatus according to claim 1, wherein the concave-convex shape forming unit and the resin supply unit are held by a single holding member to constitute a working head so as to have a predetermined positional relationship, and the moving unit moves the working head relative to the workpiece.

5. The lens manufacturing apparatus according to claim 4, wherein the concave-convex shape forming unit has a first blade that brings a blade tip into contact with the surface of the workpiece to make the notch, and a second blade that is arranged apart in a second direction intersecting the predetermined direction in which the concave-convex shape portion extends, and the resin supply unit is arranged between the two cutting blades in the second direction.

6. The lens manufacturing apparatus according to claim 1, wherein the concave-convex shape portion has a first concave-convex shape portion that extends in a first direction, and a second concave-convex shape portion that extends in a second direction intersecting the first direction.

7. A lens manufacturing apparatus comprising:

a concave-convex shape forming unit that makes a plurality of notches in a surface of a workpiece to form a plurality of concave-convex shape portions in the surface of the workpiece, the concave-convex shape portions each including a concave portion that is deeply cut from the surface of the workpiece, and a convex portion that protrudes from the surface of the workpiece;

a resin supply unit that supplies resin for the lens onto a plurality of locations on the surface of the workpiece;

a resin curing unit that cures the supplied resin for the lens, the resin curing unit being movable independently from the concave-convex shape forming unit and the resin supply unit;

a moving unit that moves the concave-convex shape forming unit and the resin supply unit, and the resin curing unit relative to the workpiece;

a working head that has the concave-convex shape forming unit and the resin supply unit, and wherein the moving unit moves the concave-convex shape forming unit and the resin supply unit by moving the working head; and a control unit that controls driving of the concave-convex shape forming unit, the resin supply unit, the resin curing unit, and the moving unit so as to form the plurality of concave-convex shape portions extending in a predetermined direction, supplies the resin for the lens between adjacent concave-convex shape portions, and cures the supplied resin for the lens.

8. The lens manufacturing apparatus according to claim 7, wherein the plurality of concave-convex shape portions have a concave portion that extends in a first direction, and a convex portion that is arranged along an opening edge of the concave portion and protrudes from the surface of the workpiece.

9. The lens manufacturing apparatus according to claim 7, wherein the concave-convex shape forming unit, the resin supply unit, and the resin curing unit are fixed and arranged in predetermined directions, and the moving unit transports the workpiece to move the concave-convex shape forming unit and the resin supply unit relative to the workpiece.

10. The lens manufacturing apparatus according to claim 7, wherein the concave-convex shape forming unit has a plurality of blades that bring blade tips into contact with the surface of the workpiece to make notches, and the plurality of blades are arrayed at predetermined intervals in a second direction intersecting the direction in which the concave-convex shape portions extend.

11. The lens manufacturing apparatus according to claim 10, wherein the concave-convex shape forming unit includes a blade driving part that independently drives each of the plurality of cutting blades, and the control unit controls driving of the concave-convex shape forming unit via the blade driving part so that some of the plurality of cutting blades bring the blade tips into contact with the surface of the workpiece to make the notches, and the rest of the plurality of cutting blades do not bring the blade tip into contact with the surface of the workpiece.

12. The lens manufacturing apparatus according to claim 1, wherein the workpiece is a sheet member having a base made of a resin material.

13. The lens manufacturing apparatus according to claim 12, wherein the base is made of an uncured resin material.

14. The lens manufacturing apparatus according to claim 1, wherein the concave-convex shape forming unit has a plurality of blades that forms a single concave-convex shape portion.

15. The lens manufacturing apparatus according to claim 1, wherein the concave-convex shape forming unit has a plurality of needle-shaped blades that forms a single concave-convex shape portion.

16. The lens manufacturing apparatus according to claim 1, wherein a wall of the concave-convex portion is continuous and substantially straight along the notch.

17. The lens manufacturing apparatus according to claim 7, wherein a wall of each of the concave-convex portions is continuous and substantially straight along each of the plurality of notches.

\* \* \* \* \*